US012689456B2

(12) United States Patent
Xu et al.

(10) Patent No.: US 12,689,456 B2
(45) Date of Patent: Jul. 21, 2026

(54) CROSS LINK INTERFERENCE MEASUREMENTS BY LOW-TIER USER EQUIPMENT

(71) Applicant: QUALCOMM Incorporated, San Diego, CA (US)

(72) Inventors: Huilin Xu, Temecula, CA (US); Yongjun Kwak, San Diego, CA (US); Muhammad Sayed Khairy Abdelghaffar, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 481 days.

(21) Appl. No.: 18/336,771

(22) Filed: Jun. 16, 2023

(65) Prior Publication Data

US 2024/0421925 A1 Dec. 19, 2024

(51) Int. Cl.
  *H04B 17/345* (2015.01)
  *H04L 5/00* (2006.01)
  *H04L 5/14* (2006.01)

(52) U.S. Cl.
  CPC ......... *H04B 17/345* (2015.01); *H04L 5/0051* (2013.01); *H04L 5/006* (2013.01); *H04L 5/1469* (2013.01)

(58) Field of Classification Search
  CPC ..... H04B 17/345; H04L 5/0051; H04L 5/006; H04L 5/1469
  USPC .................................................. 370/241, 252
  See application file for complete search history.

(56) References Cited

U.S. PATENT DOCUMENTS

| | | | |
|---|---|---|---|
| 2020/0228213 A1* | 7/2020 | Masal ........................ | H04L 5/14 |
| 2022/0015114 A1* | 1/2022 | Xu ........................... | H04L 5/0073 |
| 2024/0015546 A1* | 1/2024 | Awadin ................. | H04W 24/10 |
| 2025/0062789 A1* | 2/2025 | Kang ..................... | H04B 1/525 |
| 2025/0266915 A1* | 8/2025 | Khan Beigi .......... | H04L 1/0026 |

* cited by examiner

*Primary Examiner* — Obaidul Huq
(74) *Attorney, Agent, or Firm* — Procopio, Cory, Hargreaves & Savitch LLP

(57) ABSTRACT

Apparatuses and methods for cross link interference measurements by low-tier UEs are described. An apparatus is configured to obtain a CLI measurement based on a set of RBs associated with a DL channel from a network node. The set of RBs includes one of (1) less than a total number of RBs configured for a signal strength CLI measurement or (2) at least the total number of RBs configured for a power CLI measurement. The set of RBs is within a CLI time period that exceeds a CLI time threshold. The apparatus is configured to activate, based on the CLI measurement, a TDD slot format associated with a TDD configuration or a communication schedule from the network node.

30 Claims, 13 Drawing Sheets

800

802 obtain a CLI measurement based on a set of RBs associated with a DL channel from a network node, where the set of RBs includes one of (1) less than a total number of RBs configured for a signal strength CLI measurement or (2) at least the total number of RBs configured for a power CLI measurement, where the set of RBs is within a CLI time period that exceeds a CLI time threshold

804 activate, based on the CLI measurement, a TDD slot format associated with a TDD configuration or a communication schedule from the network node

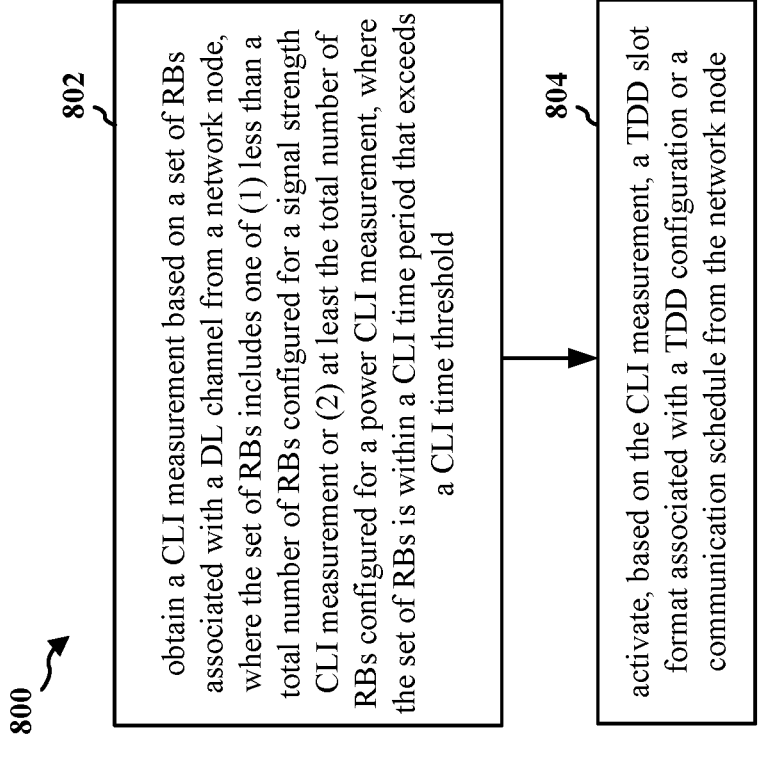

FIG. 8

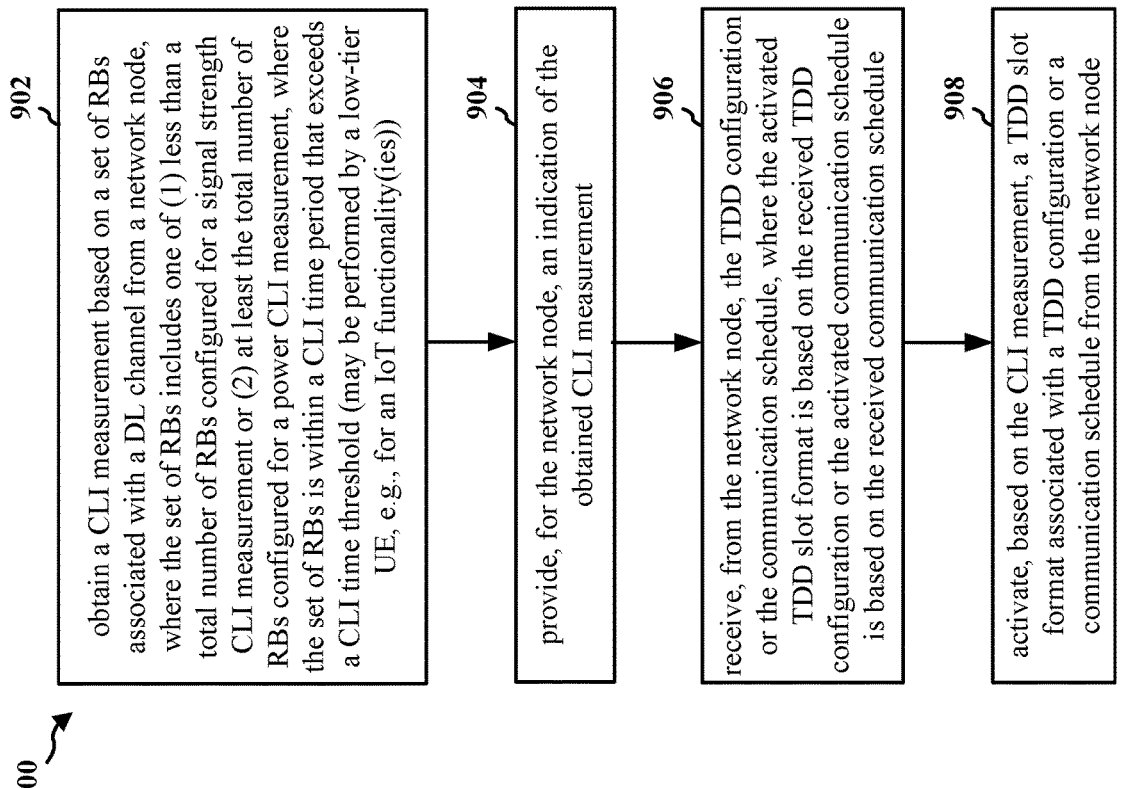

902 obtain a CLI measurement based on a set of RBs associated with a DL channel from a network node, where the set of RBs includes one of (1) less than a total number of RBs configured for a signal strength CLI measurement or (2) at least the total number of RBs configured for a power CLI measurement, where the set of RBs is within a CLI time period that exceeds a CLI time threshold (may be performed by a low-tier UE, e.g., for an IoT functionality(ies))

904 provide, for the network node, an indication of the obtained CLI measurement 906 receive, from the network node, the TDD configuration or the communication schedule, where the activated TDD slot format is based on the received TDD configuration or the activated communication schedule is based on the received communication schedule 908 activate, based on the CLI measurement, a TDD slot format associated with a TDD configuration or a communication schedule from the network node

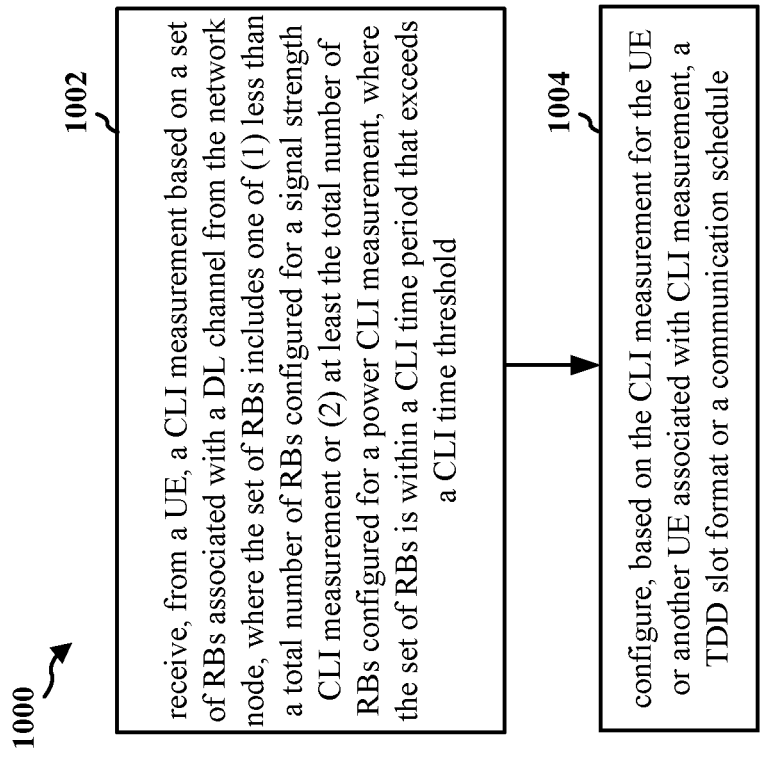

1000

1002 receive, from a UE, a CLI measurement based on a set of RBs associated with a DL channel from the network node, where the set of RBs includes one of (1) less than a total number of RBs configured for a signal strength CLI measurement or (2) at least the total number of RBs configured for a power CLI measurement, where the set of RBs is within a CLI time period that exceeds a CLI time threshold

1004 configure, based on the CLI measurement for the UE or another UE associated with CLI measurement, a TDD slot format or a communication schedule

FIG. 10

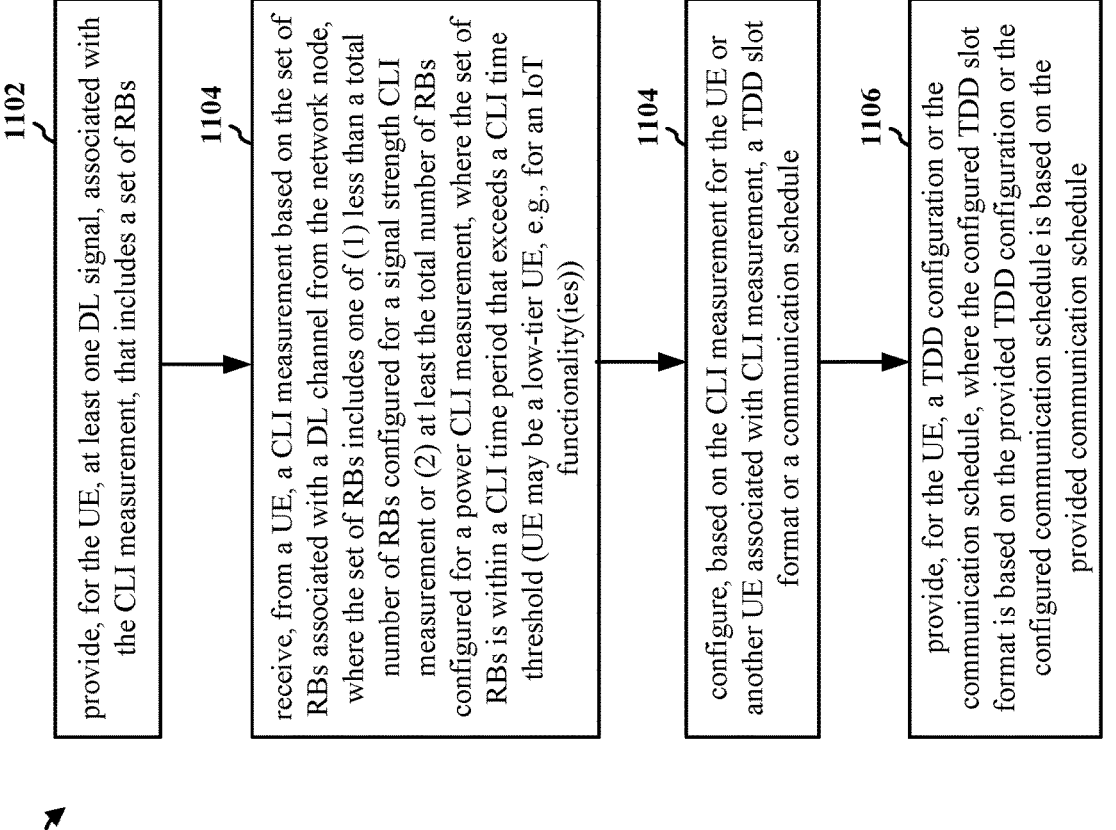

1100

1102 provide, for the UE, at least one DL signal, associated with the CLI measurement, that includes a set of RBs

1104 receive, from a UE, a CLI measurement based on the set of RBs associated with a DL channel from the network node, where the set of RBs includes one of (1) less than a total number of RBs configured for a signal strength CLI measurement or (2) at least the total number of RBs configured for a power CLI measurement, where the set of RBs is within a CLI time period that exceeds a CLI time threshold (UE may be a low-tier UE, e.g., for an IoT functionality(ies))

1104 configure, based on the CLI measurement for the UE or another UE associated with CLI measurement, a TDD slot format or a communication schedule

1106 provide, for the UE, a TDD configuration or the communication schedule, where the configured TDD slot format is based on the provided TDD configuration or the configured communication schedule is based on the provided communication schedule

FIG. 11

CROSS LINK INTERFERENCE MEASUREMENTS BY LOW-TIER USER EQUIPMENT

TECHNICAL FIELD

The present disclosure relates generally to communication systems, and more particularly, to wireless communications utilizing interference management.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus is configured to obtain a cross link interference (CLI) measurement based on a set of resource blocks (RBs) associated with a downlink (DL) channel from a network node, where the set of RBs includes one of (1) less than a total number of RBs configured for a signal strength CLI measurement or (2) at least the total number of RBs configured for a power CLI measurement, where the set of RBs is within a CLI time period that exceeds a CLI time threshold. The apparatus is also configured to activate, based on the CLI measurement, a time division duplex (TDD) slot format associated with a TDD configuration or a communication schedule from the network node.

In the aspect, the method includes obtaining a CLI measurement based on a set of RBs associated with a DL channel from a network node, where the set of RBs includes one of (1) less than a total number of RBs configured for a signal strength CLI measurement or (2) at least the total number of RBs configured for a power CLI measurement, where the set of RBs is within a CLI time period that exceeds a CLI time threshold. The method also includes activating, based on the CLI measurement, a TDD slot format associated with a TDD configuration or a communication schedule from the network node.

In another aspect of the disclosure, a method, a computer-readable medium, and an apparatus are provided. The apparatus is configured to receive, from a user equipment (UE), a CLI measurement based on a set of RBs associated with a DL channel from the network node, where the set of RBs includes one of (1) less than a total number of RBs configured for a signal strength CLI measurement or (2) at least the total number of RBs configured for a power CLI measurement, where the set of RBs is within a CLI time period that exceeds a CLI time threshold. The apparatus is configured to configure, based on the CLI measurement for the UE or another UE associated with CLI measurements, a TDD slot format or a communication schedule.

In the aspect, the method includes receiving, from a UE, a CLI measurement based on a set of RBs associated with a DL channel from the network node, where the set of RBs includes one of (1) less than a total number of RBs configured for a signal strength CLI measurement or (2) at least the total number of RBs configured for a power CLI measurement, where the set of RBs is within a CLI time period that exceeds a CLI time threshold. The method also includes configuring, based on the CLI measurement for the UE or another UE associated with CLI measurements, a TDD slot format or a communication schedule.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 8 is a flowchart of a method of wireless communication, in accordance with various aspects of the present disclosure.

FIG. 9 is a flowchart of a method of wireless communication, in accordance with various aspects of the present disclosure.

FIG. 10 is a flowchart of a method of wireless communication, in accordance with various aspects of the present disclosure.

FIG. 11 is a flowchart of a method of wireless communication, in accordance with various aspects of the present disclosure.

DETAILED DESCRIPTION

Figure 1:
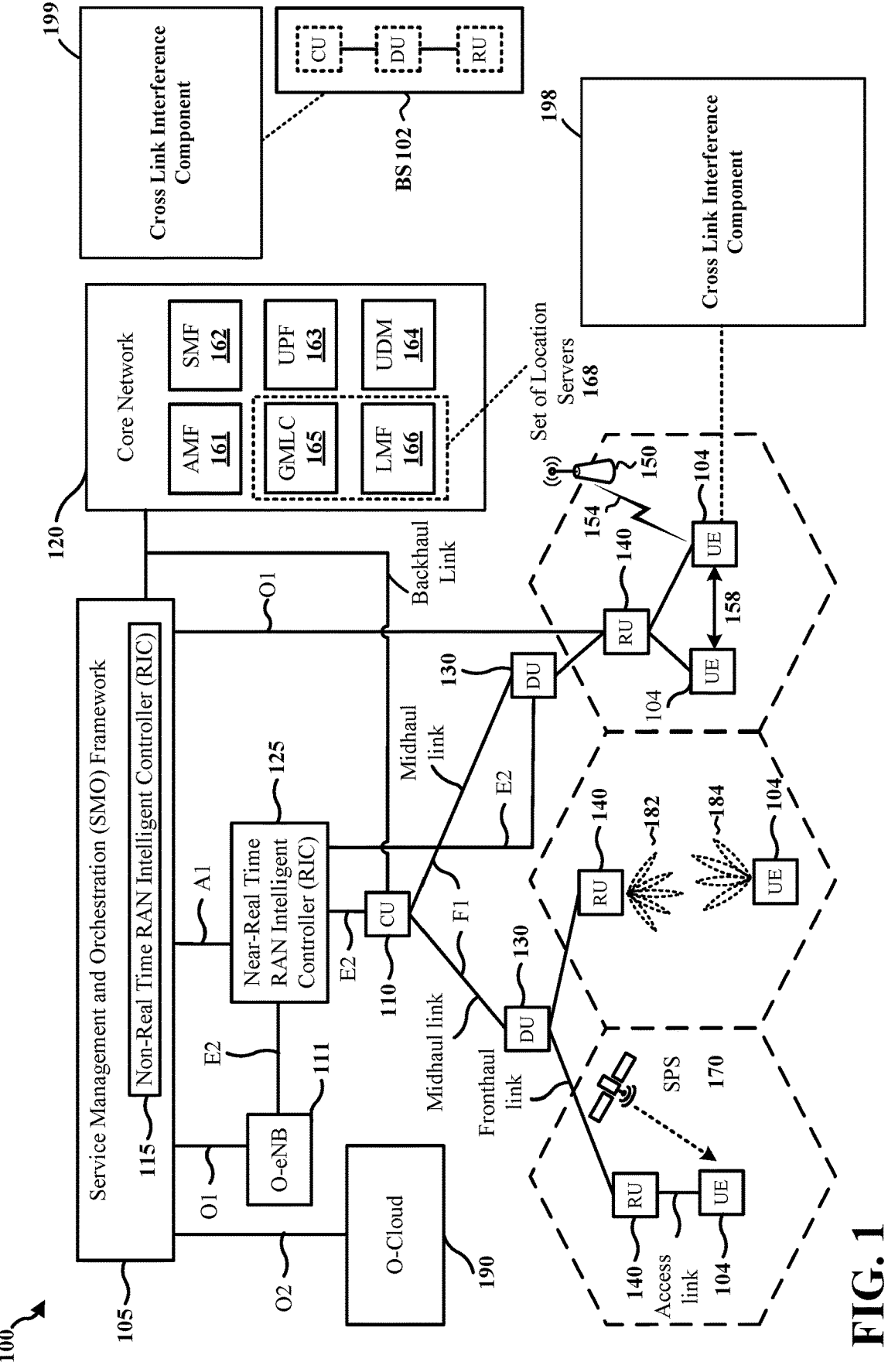
FIG. 1 is a diagram illustrating an example of a wireless communications system and an access network.

Wireless communication networks, such as a 5G NR network, may enable a UE to measure and report experienced interference, such as CLI. For example, CLI measurements may measure inter-UE interference, from an aggressor/interfering UE, to the DL serving cell reception of a victim UE. For eMBB UEs, as well as other premium UEs such as URLLC UEs, cellular V2X UEs, etc., 5G NR networks may allow for a victim UE to use the received beam of the last received physical downlink shared channel (PDSCH) or a monitored physical downlink control channel (PDCCH) to measure CLI. With mid-tier UEs, such as reduced capability (RedCap) UEs for wearables, industrial IoT, and surveillance camera use cases, wireless communication networks may relax peak throughput, latency, and reliability characteristics, e.g., as compared to eMBB UEs, for various functions.

However, low-tier UEs, such enhanced RedCap (eRedCap) UEs, may have further reduced hardware capabilities that allow a restricted number of physical resource blocks (PRBs) to be processed in each slot. Yet, low-tier UEs may benefit from performance of CLI measurements to facilitate spectrum reuse across UEs, however the complexity and/or latency of such measurements, e.g., as performed in premium or mid-tier UEs may be of a higher complexity/shorter latency than can be accomplished by low-tier UEs, such eRedCap UEs. For instance, the UL transmission from an aggressor UE that causes the CLI may not be narrowband, and a victim UE that is low-tier may not be capable of performing CLI measurements of such complexity and/or with a low latency (e.g., an eMBB aggressor UE may transmit a PUSCH in 20 MHz, or an eRedCap aggressor UE may transmit SRS for UL channel sounding in 20 MHz).

Various aspects relate generally to wireless communications systems and interference management for wireless devices. Some aspects more specifically relate to cross link interference measurements by low-tier UEs. In one example, a UE may obtain a cross link interference (CLI) measurement based on a set of resource blocks (RBs) associated with a downlink (DL) channel from a network node. The set of RBs may include one of (1) less than a total number of RBs configured for a signal strength CLI measurement or (2) at least the total number of RBs configured for a power CLI measurement, and the set of RBs may be within a CLI time period that exceeds a CLI time threshold. The UE may also activate, based on the CLI measurement, a time division duplex (TDD) slot format associated with a TDD configuration or a communication schedule from the network node. In another example, a network node, e.g., a base station and/or the like, may receive, from a user equipment (UE), a CLI measurement based on a set of RBs associated with a DL channel from the network node. The set of RBs may include one of (1) less than a total number of RBs configured for a signal strength CLI measurement or (2) at least the total number of RBs configured for a power CLI measurement, and the set of RBs may be within a CLI time period that exceeds a CLI time threshold. The network node may configure, based on the CLI measurement for the UE or another UE associated with CLI measurements, a TDD slot format or a communication schedule.

Particular aspects of the subject matter described in this disclosure can be implemented to realize one or more of the following potential advantages. In some examples, by reducing the maximum number of RBs to measure for CLI measurements on each CLI measurement occasion, the described techniques can be used to enable a low-tier UE to perform CLI measurements on UL transmissions from an aggressor UE that are outside of the bandwidth capabilities for low-tier UEs. In some examples, by relaxing the minimum processing time of CLI measurements for each CLI measurement occasion, the described techniques can be used to enable a low-tier UE to timely perform CLI measurements. In some examples, by reducing the complexity of CLI measurements, the described techniques can be used to enable a low-tier UE facilitate spectrum reuse across UEs.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EE-PROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS. 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHZ (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHZ), FR4 (71 GHz-114.25 GHz), and FR5 (114.25 GHZ-300 GHz). Each of these higher frequency bands falls within the EHF band.

With the above aspects in mind, unless specifically stated otherwise, the term "sub-6 GHz" or the like if used herein may broadly represent frequencies that may be less than 6 GHZ, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may have a cross link interference component 198 ("component 198") that may be configured to obtain a CLI measurement based on a set of RBs associated with a DL channel from a network node, where the set of RBs includes one of (1) less than a total number of RBs configured for a signal strength CLI measurement or (2) at least the total number of RBs configured for a power CLI measurement, where the set of RBs is within a CLI time period that exceeds a CLI time threshold. The component 198 may also be configured to activate, based on the CLI measurement, a TDD slot format associated with a TDD configuration or a communication schedule from the network node. The component 198 may be configured to provide, for the network node, an indication of the obtained CLI measurement. The component 198 may be configured to receive, from the network node, the TDD configuration or the communication schedule, where the activated TDD slot format is based on the received TDD configuration or the activated communication schedule is based on the received communication schedule. In certain aspects, the base station 102 may have a cross link interference component 199 ("component 199") that may be configured to receive, from a UE, a CLI measurement based on a set of RBs associated with a DL channel from the network node, where the set of RBs includes one of (1) less than a total number of RBs configured for a signal strength CLI measurement or (2) at least the total number of RBs configured for a power CLI measurement, where the set of RBs is within a CLI time period that exceeds a CLI time threshold. The component 199 may also be configured to configure, based on the CLI measurement for the UE or another UE associated with CLI measurements, a TDD slot format or a communication schedule. The component 199 may be configured to provide, for the UE, at least one DL signal, associated with the CLI measurement, that includes the set of RBs. The component 199 may be configured to provide, for the UE, the TDD configuration or the communication schedule, where the configured TDD slot format is based on the provided TDD configuration or the configured communication schedule is based on the provided communication schedule. Accordingly, aspects herein provide for measuring CLI over a limited number of RBs and/or over relaxed timelines for low-tier UEs to accommodate reduced bandwidth and baseband processing capabilities and of low-tier UEs.

Figures 2A, 2B, 2C, 2D:
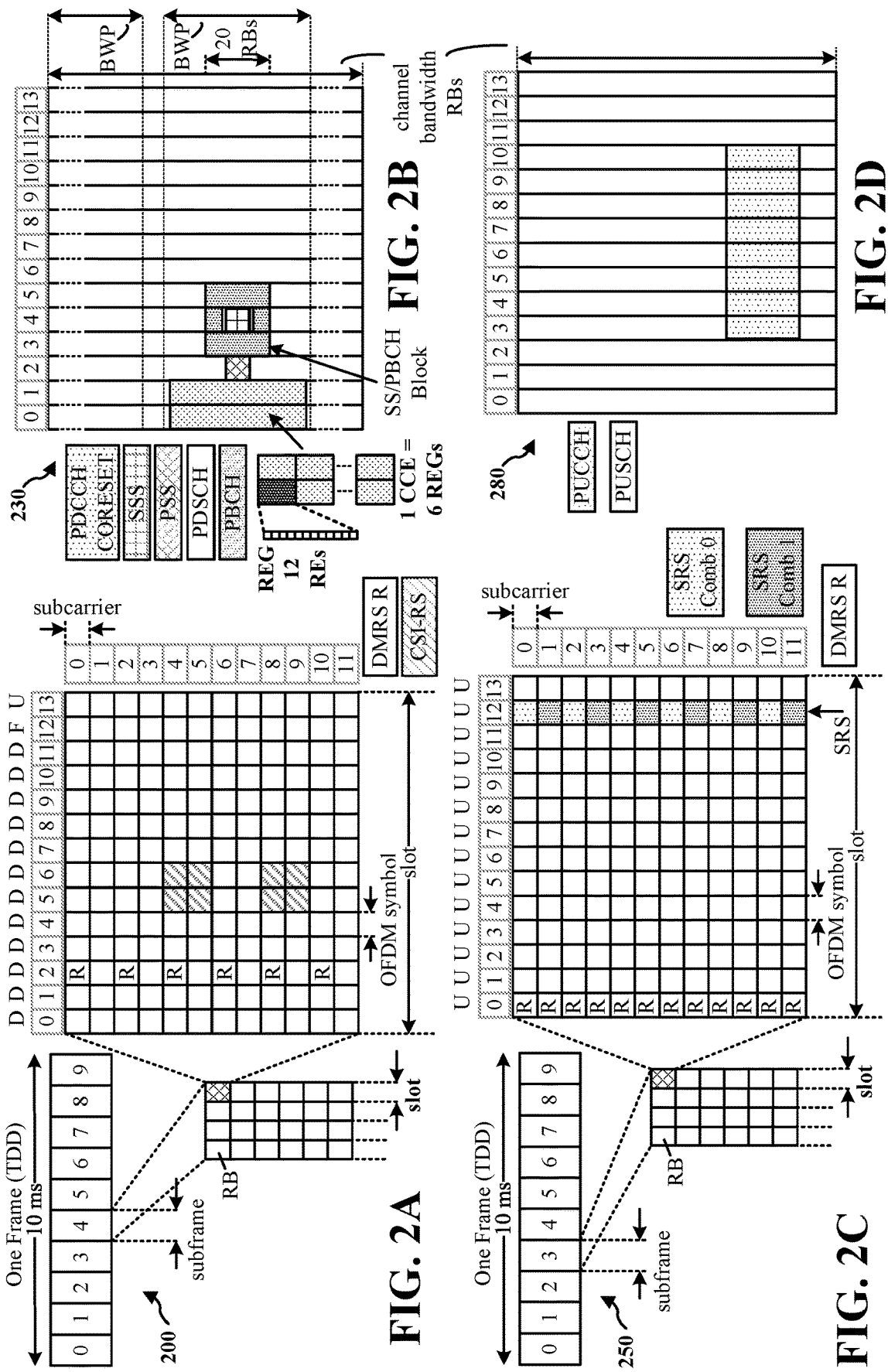
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| μ | SCS<br>$\Delta f = 2^\mu \cdot 15[\text{kHz}]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and 24 slots/subframe. The subcarrier spacing may be equal to $2^\mu * 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
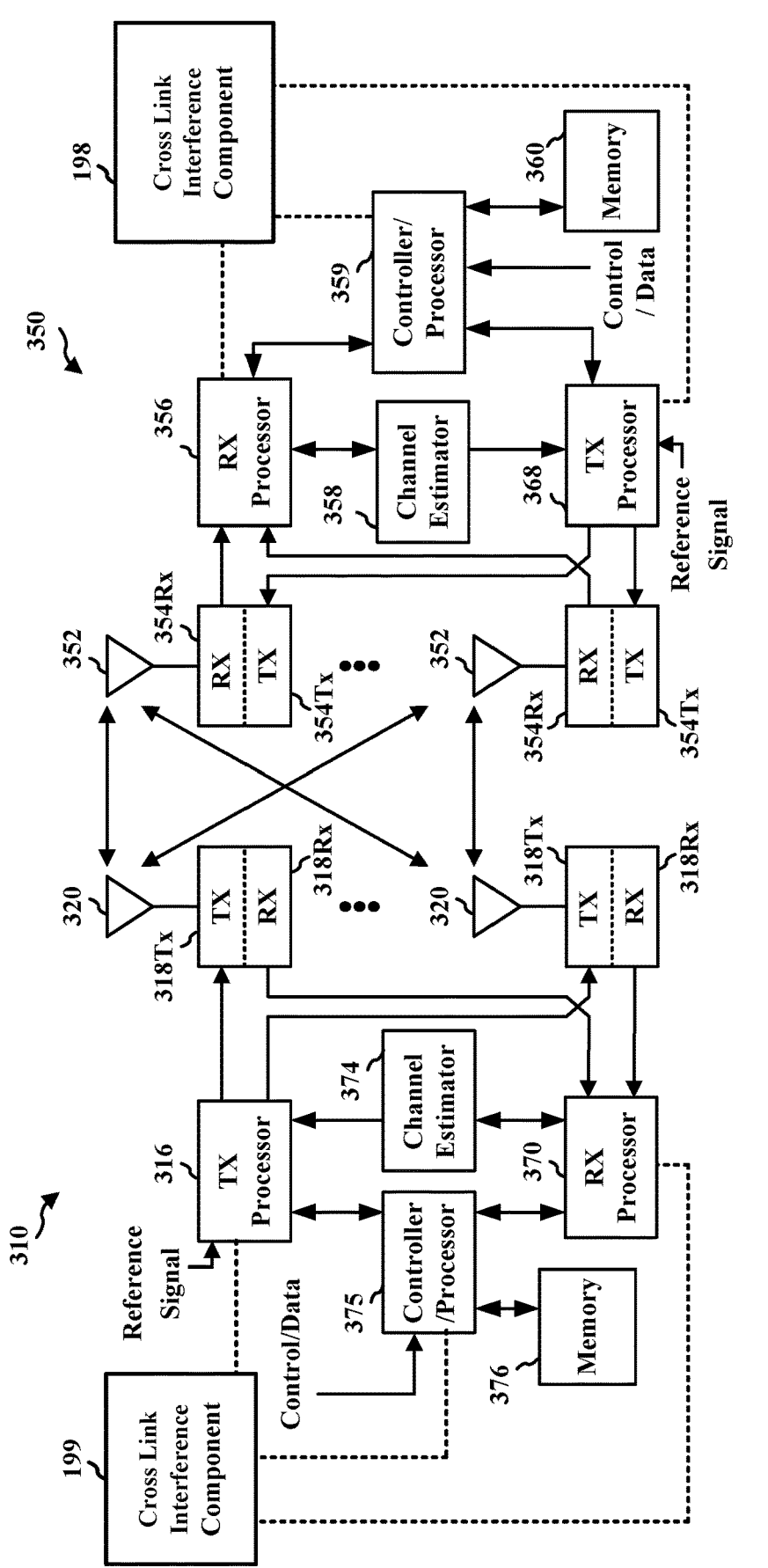
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the component 198 of FIG. 1. At least one of the TX processor 316, the RX processor 370, and the controller/processor 375 may be configured to perform aspects in connection with the component 199 of FIG. 1.

CLI measurements may measure inter-UE interference, from an aggressor/interfering UE, to the DL serving cell reception of a victim UE. For enhanced mobile broadband eMBB UEs, as well as other premium UEs such as URLLC UEs, cellular V2X UEs, etc., 5G NR networks may allow for a victim UE to use the received beam of the last received PDSCH or a monitored PDCCH to measure CLI. With mid-tier UEs, such as RedCap UEs for wearables, industrial IoT, and surveillance camera use cases, wireless communication networks may relax peak throughput, latency, and reliability characteristics, e.g., as compared to eMBB UEs, for various functions. Generally, such premium and mid-tier UEs may be referred to herein as "high-function" UEs based on their processing capabilities. However, low-tier UEs (also "enhanced reduced capability" UEs, herein), such eRedCap UEs, may have further reduced hardware capabilities that allow a restricted number of PRBs to be processed in each slot. Yet, low-tier UEs may benefit from performance of CLI measurements to facilitate spectrum reuse across UEs, however the complexity and/or latency of such measurements, e.g., as performed in premium or mid-tier UEs may be of a higher complexity/shorter latency than can be accomplished by low-tier UEs, such eRedCap UEs. For instance, the UL transmission from an aggressor UE that causes the CLI may not be narrowband, and a victim UE that is low-tier may not be capable of performing CLI measurements of such complexity and/or with a low latency (e.g., an eMBB aggressor UE may transmit a PUSCH in 20 MHz, or an eRedCap aggressor UE may transmit SRS for UL channel sounding in 20 MHz).

RF bandwidth of low-tier UEs may not be further reduced compared to reduced-functionality UEs, yet low-tier UEs may have capabilities for baseband processing of up to 25 PRBs (e.g., for 15 KHz SCS) and/or 11 PRBs (e.g., for 30 KHz SCS) per slot (or per hop if intra-slot frequency hopping is enabled), which may be considered narrowband herein. Thus, for a unicast PDSCH, a low-tier UE may be scheduled with a number of PRBs not greater than 25/11 PRBs for 15/30 KHz SCS respectively, while for a broadcast PDSCH, a low-tier UE may be scheduled within 20 MHZ bandwidth without a maximum number of PRBs. Additionally, a low-tier UE may take more time to process a broadcast PDSCH if it is scheduled with a number of PRBs larger than 25 or 11, as noted above, compared to a unicast PDSCH, but premium UEs may support up to 100 MHz bandwidth and mid-tier UEs may support up to 20 MHz bandwidth.

Figure 4:
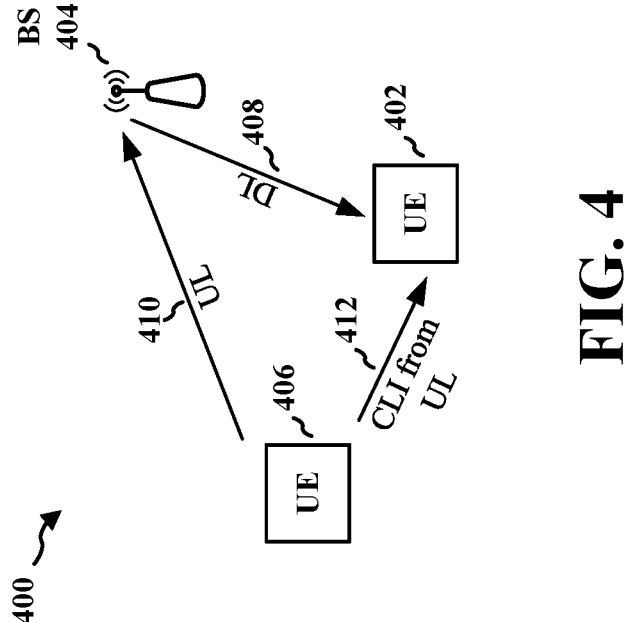
FIG. 4 is a diagram illustrating example CLI between a victim UE and an aggressor UE.

FIG. 4 is a diagram 400 illustrating example CLI between a victim UE and an aggressor UE. Diagram 400 shows a victim UE 402 and an aggressor UE 406 communicating with a base station 404.

The aggressor UE 406 provides a signal via an UL channel 410 from which CLI 412 is experienced by the victim UE 402 on a signal via a DL channel 408. That is, the signal via the UL channel 410 causes the victim UE 402 to experience the CLI 412 on the signal via the DL channel 408. In the context of low-tier UE deployment, e.g., for IoT applications, the number of UEs in a given cell may be much larger, e.g., by orders of magnitude, compared to the number of cellular phones. It may thus be preferable to configure different semi-static TDD UL-DL slot format configurations or dynamic TDD UL-DL slot formats to UEs in TDD bands. For example, at a given time, there may be UEs both transmitting and receiving in the same frequency band. This may result in spectrum reuse across UEs and full duplexing at base stations, which may substantially increase the spectral efficiency of the cell.

However, such deployments may suffer from cases in which a transmission of one UE (e.g., an aggressor) causes interference to another nearby UE (e.g., a victim) that receives in the same slot, e.g., CLI. For FR2 scenarios, CLI may also depend on Tx and Rx beam directions of the aggressor and/or victim UEs. To avoid excessive CLI for serving cell DL signals, a wireless network may avoid configuring TDD UL-DL slot formats that cause strong CLI. The wireless network may configure CLI measurements to the potential victim UEs, and the CLI measurement resources thus configured may correspond to the UL transmission(s) of potential aggressor UEs. Therefore, based on a CLI measurement report(s) of a victim UE, a base station may avoid configuring conflicting TDD UL-DL slot formats to UEs if a measured CLI is strong. Otherwise, a base station may configure conflicting TDD UL-DL slot formats to UEs so that spectral efficiency is improved. Accordingly, aspects herein may consider and account for full duplex at the base station and low-tier UE designs.

A low-tier UE may desire to perform, or benefit from performing. CLI measurements to facilitate spectrum reuse across UEs, yet such measurements should be of low complexity and related timing for low-tier UEs to perform. Various aspects herein for CLI measurements by low-tier UEs (e.g., eRedCap UEs) may enable a low-tier UE to perform CLI measurements on UL transmissions from an aggressor UE that are outside of the bandwidth capabilities for low-tier UEs by reducing the maximum number of RBs (e.g., bandwidth) to measure for CLI measurements on each CLI measurement occasion. In aspects, for CLI received signal strength indicator (RSSI) measurements, the CLI measurements can be performed over a reduced number of RBs supported by low-tier UEs. That is, aspects provide solutions to reduced bandwidth capabilities of low-tier UEs for baseband processing of CLI measurements. UL transmissions from aggressor UEs that cause CLI may not be narrowband (e.g., an eMBB aggressor UE may transmit a PUSCH in 20 MHz, or an eRedCap aggressor UE may transmit SRS for UL channel sounding in 20 MHZ); accordingly, various aspects may also enable a low-tier UE to timely perform CLI measurements by relaxing the minimum processing time of CLI measurements for each CLI measurement occasion, and may also enable a low-tier UE facilitate spectrum reuse across UEs by reducing the complexity of CLI measurements.

Unlike channel estimations for demodulation, CLI measurements may be sufficient for their purposes, e.g., for low-tier UEs, even if such measurements are not overly accurate. Thus, aspects herein provide for measuring CLI over a limited number of RBs and/or over relaxed timelines for low-tier UEs. Aspects herein contemplate CLI measurement complexity reductions for the following cases, without limitation: CLI RSSI measurements, CLI SRS reference signal received power (RSRP) measurements, Layer 3 (L3) CLI measurements and reports, dynamic CLI measurements and reports for Layer 1 (L1) and Layer 2 (L2), CLI measurements in a limited (e.g., <<20 MHZ) number of RBs, relaxation of CLI measurement and report timelines, and/or the like.

Figure 5:
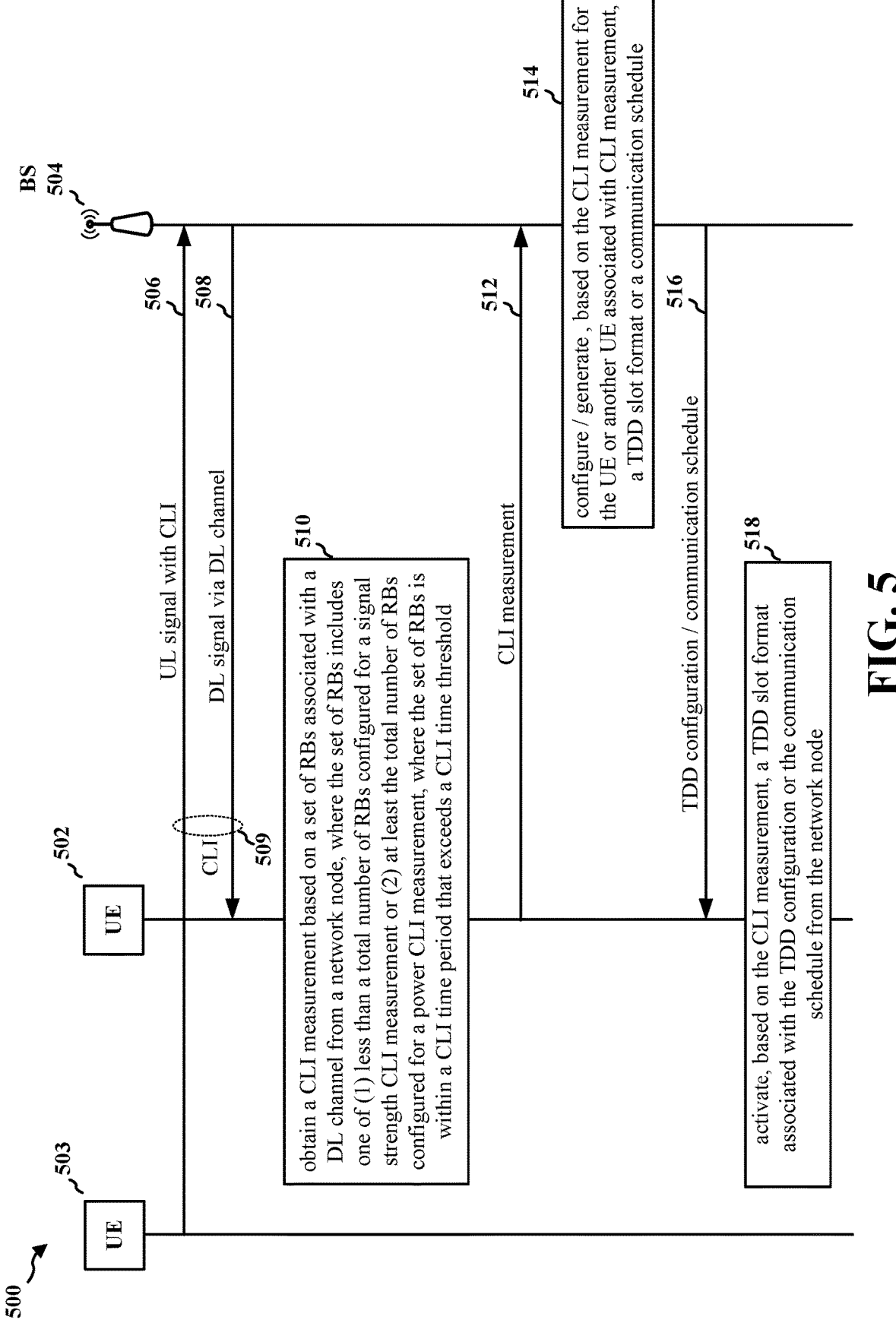
FIG. 5 is a call flow diagram for wireless communications, in accordance with various aspects of the present disclosure.

FIG. 5 is a call flow diagram 500 for wireless communications, in various aspects. Call flow diagram 500 illustrates configurations for CLI measurements by a low-tier UE (e.g., a UE 502) that may communicate with a network node (a base station 504, such as a gNB or other type of base station, by way of example, as shown) and that may experience CLI from an aggressor UE (e.g., a UE 503). Aspects described for the base station 504 may be performed by the base station in aggregated form and/or by one or more components of the base station 504 in disaggregated form. Additionally, or alternatively, the aspects may be performed by the UE 502 autonomously, in addition to, and/or in lieu of, operations of the base station 504.

In the illustrated aspect, the UE 503 may be configured to provide/transmit an UL signal 506 on an UL channel to the base station 504, and the UE 502 may be configured to receive a DL signal 508 on a DL channel from the base station 504. In aspects, the UL signal 506 may cause, or include, CLI 509 with respect to the UE 502 for the DL signal 508 on the DL channel. The UL signal 506 may be provided via a PUSCH, may be a SRS, and/or the like, and the DL signal 508 may be provided via a PDSCH and/or PDCCH in a CORESET, via both, may be a CLI resource, and/or the like. As noted above, aggressor UEs may provide UL transmissions to network nodes (e.g., base stations, gNBs, and/or the like) that cause the CLI 509 which may not be narrowband, and a low-tier, victim UE that may not be capable of performing CLI measurements of such complexity and/or with a low latency (e.g., an eMBB aggressor UE may transmit a PUSCH in 20 MHz, or a low-tier, aggressor UE may transmit SRS for UL channel sounding in 20 MHz).

The UE 502 may be configured to obtain (at 510) a CLI measurement 512 based on a set of RBs associated with a DL channel from a network node. The UE 502 may be configured to obtain (at 510) the CLI measurement 512 by measuring and/or estimating the CLI 509. In aspects, the CLI measurement 512 may be at least one of an L3 RSSI CLI measurement, a dynamic L1 RSSI CLI measurement, or a dynamic L2 RSSI CLI measurement. In aspects, the set of RBs may include one of (1) less than a total number of RBs configured for a signal strength CLI measurement (e.g., the CLI measurement 512) or (2) at least the total number of RBs configured for a power CLI measurement (e.g., the CLI measurement 512). In aspects, the set of RBs may be within a CLI time period that exceeds a CLI time threshold, as described in further detail below with respect to FIG. 7, by a relaxation time period. The UE 502 may be configured to provide/transmit, and the base station 504 may be configured to receive, the CLI measurement 512.

The base station 504 may be configured to configure/generate (at 514), based on the CLI measurement 512 for the UE 502 or another UE (e.g., the UE 503) associated with CLI measurements, a TDD configuration/a communication schedule 516. The TDD configuration/the communication schedule 516 may include a TDD configuration for a TDD slot format. The base station 504 may be configured to provide/transmit the TDD configuration/the communication schedule 516 that is configured/generated (at 514) for the UE 502 (and/or the UE 503, not shown for brevity and clarity of illustration). For instance, the base station 504 may configure/generate (at 514) the TDD configuration/the communication schedule 516 as different semi-static TDD UL-DL slot format configurations or dynamic TDD UL-DL slot formats for UEs in available TDD bands to reduce the CLI 509.

The UE 502 may be configured to activate (at 518), based on the CLI measurement 512, a TDD slot format associated with the TDD configuration or the communication schedule 516 from the base station 504 (e.g., a network node). The base station 504 may thus avoid configuring conflicting TDD UL-DL slot formats to the UE 502 and/or the UE 503 based on the CLI measurement 512 (e.g., when indicating a high value for the CLI 509). Otherwise, the base station 504 may configure conflicting TDD UL-DL slot formats to UEs so that spectral efficiency is improved (e.g., when indicating a low value for the CLI 509). Accordingly, spectrum reuse across UEs and full duplexing at base stations is enabled to substantially increase the spectral efficiency of the cell in which the UE 502, the UE 503, and the base station 504 are located.

Figure 6:
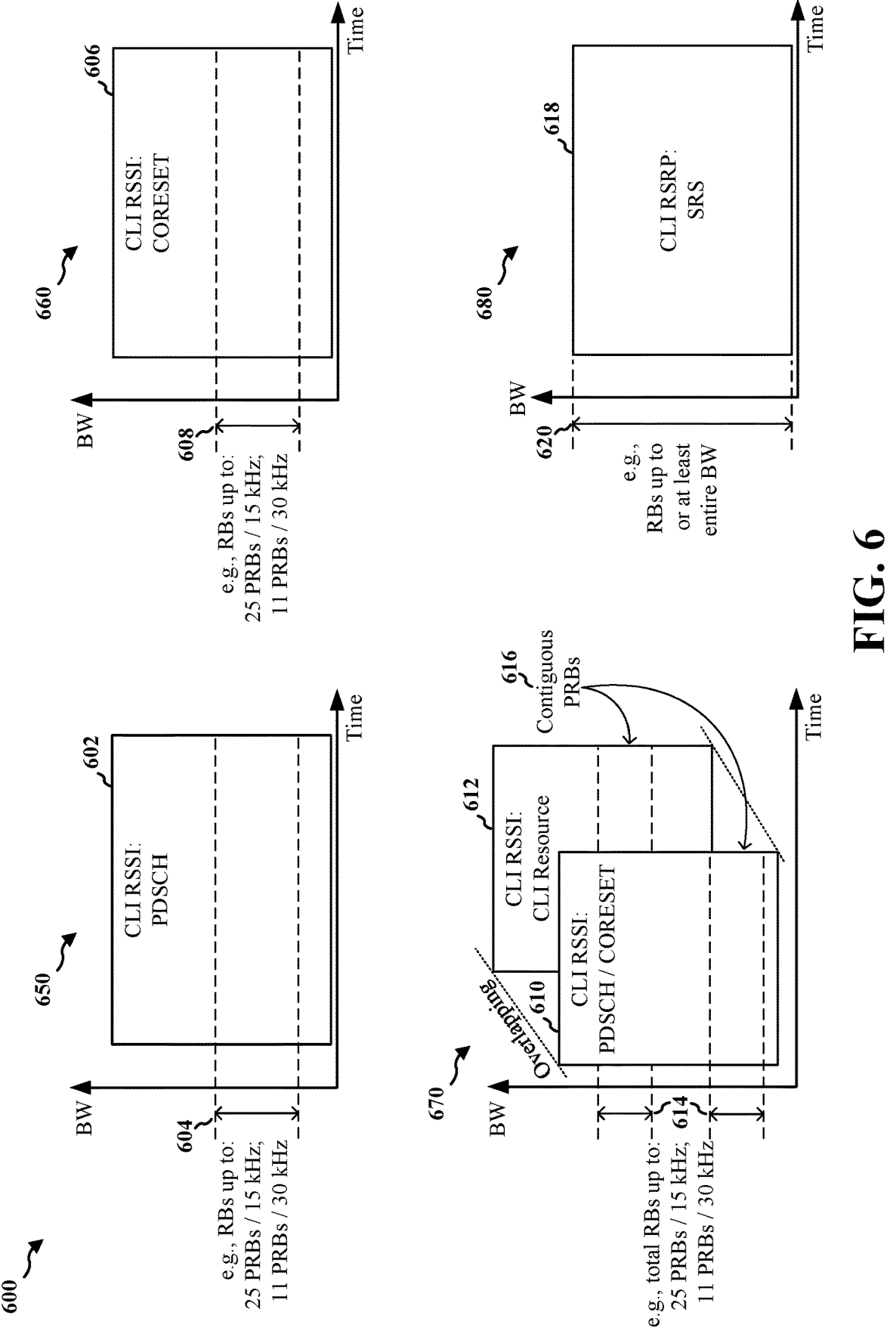
FIG. 6 is a diagram illustrating example CLI measurement configurations over reduced RBs for low-tier UEs, in accordance with various aspects of the present disclosure.

FIG. 6 is a diagram 600 illustrating example CLI measurement configurations over reduced RBs for low-tier UEs, in various aspects. Diagram 600 shows, without limitation, a configuration 650, a configuration 660, a configuration 670, and a configuration 680, each of which provides, by way of example, sets of RBs by which a low-tier UE may perform CLI measurements, according to aspects herein. As noted above, low-tier UEs may have capabilities for baseband processing of up to 25 PRBs (e.g., for 15 KHz SCS) and/or 11 PRBs (e.g., for 30 KHz SCS) per slot (or per hop if intra-slot frequency hopping is enabled), and diagram 600 is described below in this context.

CLI measurements may allow a UE to measure inter-UE interference for DL serving cell reception. For eMBB UEs, or other premium/high-tier UEs in 5G NR, a victim UE may use the Rx (receive) beam of the latest received PDSCH or monitored PDCCH to measure the CLI. The configuration 650, the configuration 660, and the configuration 670 illustrate, for CLI RSSI measurements, a similar implementation as for the Rx beam determination but extend implementations, according to aspects herein, to utilize a reduced number of RBs for complexity reduction (e.g., which may result in lower complexity as the CORESET may span a full bandwidth supported by the RF). In aspects, the CLI measurement may be at least one of an L3 RSSI CLI measurement, a dynamic L1 RSSI CLI measurement, or a dynamic L2 RSSI CLI measurement. In aspects, a number of RBs used for CLI RSSI measurement (e.g., a set of RBs, as described herein) may vary according to the number of RBs allocated to a PDSCH. Aspects herein may thus accommodate this issue for L3 CLI measurement filtering if the instantaneous measurement result is first normalized by the number of RBs over which the CLI RSSI is measured.

In the configuration 650, a set of RBs 604 is scheduled for a PDSCH 602 (e.g., a most recent/latest PDSCH) assigned for the UE. The set of RBs 604 may be less than a total number of RBs scheduled for the PDSCH 602. The UE may measure CLI RSSI for the CLI measurement occasion represented by PDSCH 602 over the set of RBs 604 scheduled for this latest received PDSCH, which may be UE-specific. In aspects, the set of RBs 604 may include at least one of a first number of RBs that is less than or equal to 25 PRBs, where the SCS, for the CLI measurement occasion over the set of RBs, is 15 kHz, or a second number of RBs that is less than or equal to 11 PRBs, where the SCS, for the CLI measurement occasion over the set of RBs, is 30 KHz. In the configuration 660, a set of RBs 608 may be scheduled for a CORESET 606 (e.g., a most recently monitored CORESET) associated with a UE. The set of RBs 608 may be less than a total number of RBs scheduled for the CORESET 606. The UE may measure CLI RSSI on the CLI measurement occasion represented by the CORESET 606 over the set of RBs 608 scheduled for this latest monitored CORESET. In aspects, the set of RBs 604 may include at least one of a first number of RBs that is less than or equal to 25 PRBs, where the SCS, for the CLI measurement occasion over the set of RBs, is 15 kHz, or a second number of RBs that is less than or equal to 11 PRBs, where the SCS, for the CLI measurement occasion over the set of RBs, is 30 kHz.

Regarding both the configuration 650 and the configuration 660, a UE may measure CLI RSSI on the CLI measurement occasion represented by either of the set of RBs 604 scheduled for the latest received UE specific PDSCH (e.g., the PDSCH 602) or the set of RBs 608 scheduled for the latest monitored CORESET (e.g., the CORESET 606). In such aspects, the UE may determine which set of RBs is utilized for the CLI measurement, or the UE may be configured thus by a network node/base station.

In the configuration 670, a set of RBs 614 is included in an overlapped set of contiguous PRBs 616 between a resource 612 (e.g., a CLI resource) that corresponds to the CLI and a PDSCH/CORESET 610 (e.g., at least one of (i)

a most recent PDSCH assigned for the UE or (ii) a most recently monitored CORESET) associated with the UE. The UE may measure the RSSI CLI on the overlapped set of contiguous PRBs 616 between the PDSCH/CORESET 610 and the configured PRBs of the resource 612.

In the configuration 680, shown for a CLI RSRP measurement over an SRS 618 (which may represent a CLI measurement occasion), the CLI measurement may be performed utilizing a set of RBs 620 within the entire RF bandwidth by a low-tier UE. In aspects, multiple ones of the SRS 618 may be utilized for a CLI measurement occasion, and thus, the set of RBs 620 may extend over at least the entire RF bandwidth of a single SRS, e.g., the SRS 618 (as illustrated).

That is, the set of RBs 620 may include at least the total number of RBs configured for the slot of the DL channel with respect to the SRS 618. In aspects, as noted, the CLI measurement may be a CLI SRS measurement, and obtaining (e.g., measuring and/or estimating) the CLI SRS measurement may include obtaining the CLI SRS measurement within an entirety of a RF bandwidth, of the UE, associated with a relaxed measurement timeline for a low-tier/enhanced reduced capability UE. In aspects, obtaining (e.g., measuring and/or estimating) the CLI SRS measurement may include obtaining the CLI SRS measurement on at least one of (i) a first number of RBs that is larger than 25 PRBs, where the SCS, for the CLI SRS measurement occasion over the set of RBs, is 15 kHz, or (ii) a second number of RBs that is larger than 11 PRBs, where the SCS, for the CLI SRS measurement occasion over the set of RBs, is 30 kHz, which may be associated with a relaxed measurement timeline for a low-tier/enhanced reduced capability UE.

CLI RSSI measurement is non-coherent measurement, and may not be utilized to positively identify the specific aggressor if multiple potential aggressor UEs transmit via UL channels within the same duration. However, CLI SRS RSRP is coherent measurement, and may be used to differentiate different aggressor UEs when different SRSs are configured to these aggressors for their UL channel sounding. Coherent processing may include more complexity demands than non-coherent processing, and hence, complexity reduction for CLI SRS RSRP measurement may be utilized, e.g., may be more important, for low-tier UEs. Yet, there may be a greater challenge for coherent processing due to large numbers of potential aggressor UEs around the victim UE, e.g., such as for IoT use cases. A victim UE may thus have to measure many CLI SRS resources within a same slot and across slots, which may be even more computationally demanding than the CSI computation of the victim UE. This may be further exacerbated for dynamic CLI SRS RSRP measurements, which may be of particular importance crucial for dynamic spectrum reuse between UL and DL. Therefore, with regard to aspects herein for dynamic CLI SRS RSRP measurements, the measurement and report timelines may be relaxed. For instance, aspects may provide for L3 measurements to have no further timing restriction as the relaxed processing may be absorbed via L3 filtering of instantaneous measurement results, which may have already introduced latency. In this context, FIG. 7 is now described below.

Figure 7:
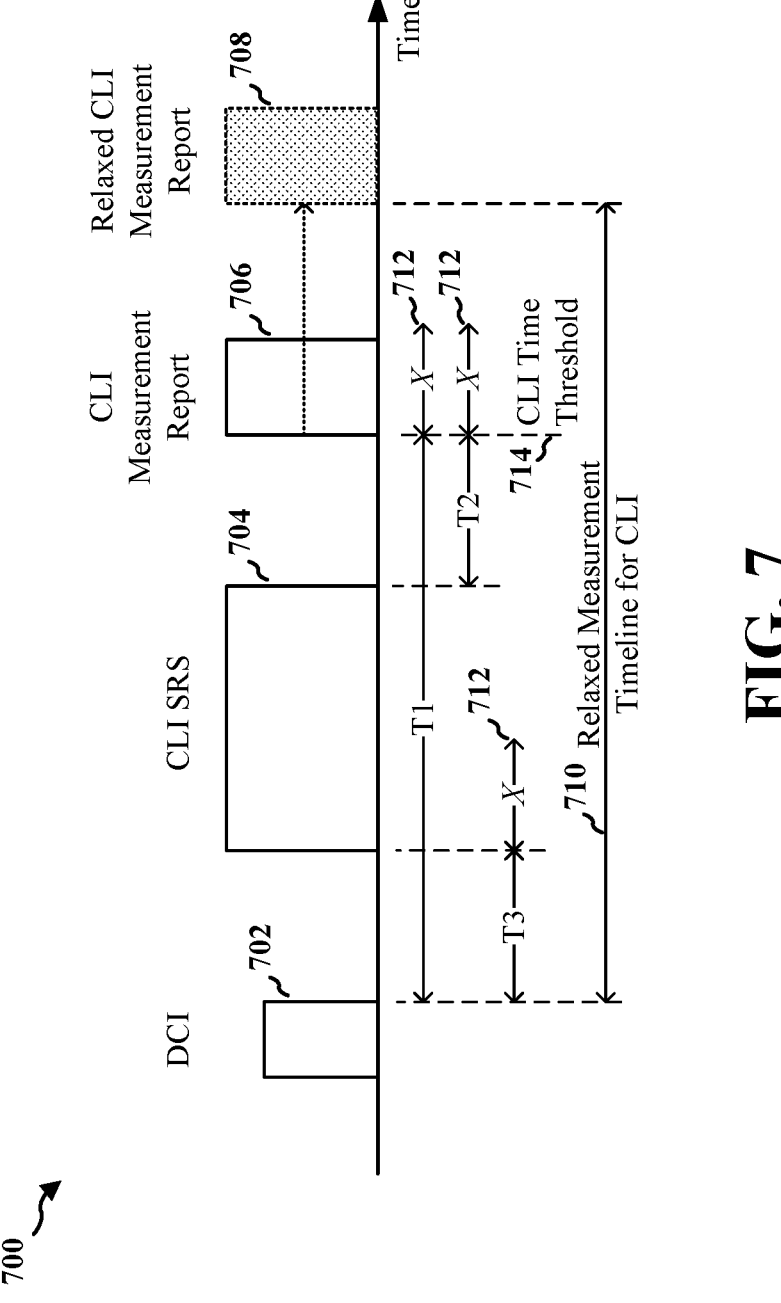
FIG. 7 is a diagram illustrating example relaxed timelines for CLI measurement in low-tier UEs, in accordance with various aspects of the present disclosure.

FIG. 7 is a diagram 700 illustrating example relaxed timelines for CLI measurement in low-tier UEs, in various aspects. As used herein, a CLI time period or timeline (e.g., a baseline time period, herein) may be a measurement and reporting CLI time period that is configured by the network, such as by a base station, network node, etc., for one or more full-function UEs, e.g., one or more premium/eMBB/mid-tier UEs, which may be higher-tier UEs than low-tier UEs. A CLI time threshold 714 may be a measurement and reporting CLI time threshold, e.g., configured by the network, by which a CLI measurement and report are to be completed and prepared for transmission by a full-function UE.

A CLI time period may be implemented as one or more (or at least one) of various baseline time periods: T1, T2, and T3. In one example, such a baseline time period (e.g., T1) may be between a first end of DCI 702, which may indicate performance of the CLI measurement, and a provision of the CLI measurement (e.g., a CLI measurement report 706) for a network node. In an additional example, such a baseline time period (e.g., T2) may be between a second end of a resource that corresponds to a CLI SRS 704 measurement and the provision of the CLI measurement (e.g., the CLI measurement report 706) for the network node. In a further example, such a baseline time period (e.g., T3) between a most recent reception of an end of DCI (e.g., for the DCI 702) that indicates performance of the CLI measurement and a subsequent reception of a resource that corresponds to the CLI SRS measurement, e.g., the SRS 704.

Aspects herein provide for relaxed measurement timelines by which a low-tier UE may perform CLI measurements and report the CLI measurements. That is, a low-tier UE may not be capable to perform and report CLI measurements within the baseline CLI time periods noted above. Accordingly, aspects allow for a relaxation time period 712 ('X', which may be in milliseconds or the like) that may be based on a number of RBs associated with a SRS or associated with the entirety of the RF bandwidth, as used for performing CLI measurements and reports thereof. A relaxed measurement timeline 710 is illustrated in diagram 700.

In aspects, the relaxed measurement timeline 710 may include a baseline CLI time periods, as noted above (e.g., T1, T2, T3), in addition to the relaxation time period 712 ('X'). In aspects, the relaxation time period 712 may be based on a SCS associated with the UE. For instance, with an SCS of 15 kHz, one value for the relaxation time period 712 may be utilized, while for an SCS of 30 kHz, another value for the relaxation time period 712 may be utilized. In one example, the larger the number of RBs utilized for performing a CLI measurement, the larger the relaxation time period 712 may be.

Accordingly, based on the relaxed measurement timeline 710 for CLI measurements in low-tier UEs, a relaxed CLI measurement report 708 may be provided/transmitted by a low-tier UE after the CLI time threshold 714, where the relaxed measurement timeline 710 is a CLI time period, according to aspects, which exceeds the CLI time threshold 714.

FIG. 8 is a flowchart 800 of a method of wireless communication, in various aspects. The method may be performed by a UE (e.g., the UE 104, 402, 502; the apparatus 1204). In some aspects, the method may include aspects described in connection with the communication flow in FIG. 5 and/or aspects described in FIGS. 6, 7. The method provides for CLI measurements by low-tier UEs and enables measuring CLI over a limited number of RBs and/or over relaxed timelines for low-tier UEs to accommodate reduced bandwidth and baseband processing capabilities thereof.

At 802, a UE obtains a CLI measurement based on a set of RBs associated with a DL channel from a network node, where the set of RBs includes one of (1) less than a total number of RBs configured for a signal strength CLI measurement or (2) at least the total number of RBs configured for a power CLI measurement, where the set of RBs is within a CLI time period that exceeds a CLI time threshold. As an example, the obtainment may be performed, at least in part, by the component 198. FIGS. 5, 6, 7 illustrate an example of the UE 502 obtaining such a CLI measurement for CLI introduced in a signal provided by an aggressor UE (e.g., the UE 503) for a network node (e.g., the base station 504).

The UE 503 may be configured to provide/transmit an UL signal 506 on an UL channel to the base station 504, and the UE 502 may be configured to receive a DL signal 508 on a DL channel from the base station 504. In aspects, the UL signal 506 may cause, or include, CLI 509 with respect to the UE 502 for the DL signal 508 on the DL channel. The UL signal 506 may be provided via a PUSCH, may be a SRS (e.g., 618 in FIG. 6), and/or the like, and the DL signal 508 may be provided via a PDSCH (e.g., 602 in FIG. 6) and/or a CORESET (e.g., 606 in FIG. 6), via both (e.g., 602, 604 in FIG. 6), may be a CLI resource, and/or the like. As noted above, aggressor UEs may provide UL transmissions to network nodes (e.g., base stations, gNBs, and/or the like) that cause the CLI 509 may not be narrowband, and a low-tier, victim UE that is may not be capable of performing CLI measurements of such complexity and/or with a low latency (e.g., an eMBB aggressor UE may transmit a PUSCH in 20 MHz, or a low-tier, aggressor UE may transmit SRS for UL channel sounding in 20 MHz). The UE 502 may be configured to obtain (at 510) a CLI measurement 512 based on a set of RBs (e.g., 604, 608, 614, 620 in FIG. 6) associated with a DL channel from a network node. The UE 502 may be configured to obtain (at 510) the CLI measurement 512 by measuring and/or estimating the CLI 509 on the DL channel. In aspects, the CLI measurement 512 may be at least one of an L3 RSSI CLI measurement, a dynamic L1 RSSI CLI measurement, or a dynamic L2 RSSI CLI measurement. In aspects, the set of RBs (e.g., 604, 608, 614, 620 in FIG. 6) may include one of (1) less than a total number of RBs configured for a signal strength CLI measurement (e.g., the CLI measurement 512) (e.g., 602, 604, 606, 608, 610, 612, 614 in FIG. 6) or (2) at least the total number of RBs configured for a power CLI measurement (e.g., the CLI measurement 512) (e.g., 618, 620 in FIG. 6). In aspects, the set of RBs (e.g., 604, 608, 614, 620 in FIG. 6) may be within a CLI time period (e.g., 710 in FIG. 7) that exceeds a CLI time threshold (e.g., 714 in FIG. 7), as described with respect to FIG. 7, by a relaxation time period (e.g., 712 in FIG. 7). The UE 502 may be configured to provide/transmit, and the base station 504 may be configured to receive, the CLI measurement 512 (e.g., 708 in FIG. 7).

At 804, the UE activates, based on the CLI measurement, a TDD slot format associated with a TDD configuration or a communication schedule from the network node. As an example, the activation may be performed, at least in part, by the component 198. FIG. 5 illustrates an example of the UE 502 activating such a TDD slot format/communication schedule (e.g., based on a configuration/schedule) from a network node (e.g., the base station 504).

The base station 504 may be configured to configure/generate (at 514), based on the CLI measurement 512 for the UE 502 or another UE (e.g., the UE 503) associated with CLI measurements, a TDD configuration/a communication schedule 516. The TDD configuration/the communication schedule 516 may include a TDD configuration for a TDD slot format. The base station 504 may be configured to provide/transmit the TDD configuration/the communication schedule 516 that is configured/generated (at 514) for the UE 502 (and/or the UE 503, not shown for brevity and clarity of illustration). For instance, the base station 504 may configure/generate (at 514) the TDD configuration/the communication schedule 516 as different semi-static TDD UL-DL slot format configurations or dynamic TDD UL-DL slot formats for UEs in available TDD bands to reduce the CLI 509. The UE 502 may be configured to activate (at 518), based on the CLI measurement 512, a TDD slot format associated with the TDD configuration or the communication schedule 516 from the base station 504 (e.g., a network node). The base station 504 may thus avoid configuring conflicting TDD UL-DL slot formats to the UE 502 and/or the UE 503 based on the CLI measurement 512 (e.g., when indicating a high value for the CLI 509). Otherwise, the base station 504 may configure conflicting TDD UL-DL slot formats to UEs so that spectral efficiency is improved (e.g., when indicating a low value for the CLI 509). Accordingly, spectrum reuse across UEs and full duplexing at base stations is enabled to substantially increase the spectral efficiency of the cell in which the UE 502, the UE 503, and the base station 504 are located.

FIG. 9 is a flowchart 900 of a method of wireless communication, in various aspects. The method may be performed by a UE (e.g., the UE 104, 402, 502; the apparatus 1204). In some aspects, the method may include aspects described in connection with the communication flow in FIG. 5 and/or aspects described in FIGS. 6, 7. The method provides for CLI measurements by low-tier UEs and enables measuring CLI over a limited number of RBs and/or over relaxed timelines for low-tier UEs to accommodate reduced bandwidth and baseband processing capabilities thereof.

At 902, a UE obtains a CLI measurement based on a set of RBs associated with a DL channel from a network node, where the set of RBs includes one of (1) less than a total number of RBs configured for a signal strength CLI measurement or (2) at least the total number of RBs configured for a power CLI measurement, where the set of RBs is within a CLI time period that exceeds a CLI time threshold. As an example, the obtainment may be performed, at least in part, by the component 198. FIGS. 5, 6, 7 illustrate an example of the UE 502 obtaining such a CLI measurement for CLI introduced in a signal provided by an aggressor UE (e.g., the UE 503) for a network node (e.g., the base station 504).

The UE 503 may be configured to provide/transmit an UL signal 506 on an UL channel to the base station 504, and the UE 502 may be configured to receive a DL signal 508 on a DL channel from the base station 504. In aspects, the UL signal 506 may cause, or include, CLI 509 with respect to the UE 502 for the DL signal 508 on the DL channel. The UL signal 506 may be provided via a PUSCH, may be a SRS (e.g., 618 in FIG. 6), and/or the like, and the DL signal 508 may be provided via a PDSCH (e.g., 602 in FIG. 6) and/or a CORESET (e.g., 606 in FIG. 6), via both (e.g., 602, 604 in FIG. 6), may be a CLI resource, and/or the like. As noted above, aggressor UEs may provide UL transmissions to network nodes (e.g., base stations, gNBs, and/or the like) that cause the CLI 509 may not be narrowband, and a low-tier, victim UE that is may not be capable of performing CLI measurements of such complexity and/or with a low latency (e.g., an eMBB aggressor UE may transmit a PUSCH in 20 MHz, or a low-tier, aggressor UE may transmit SRS for UL channel sounding in 20 MHz). The UE 502 may be configured to obtain (at 510) a CLI measurement 512 based on a set of RBs (e.g., 604, 608, 614, 620 in FIG.

6) associated with a DL channel from a network node. The UE 502 may be configured to obtain (at 510) the CLI measurement 512 by measuring and/or estimating the CLI 509 on the DL channel. In aspects, the CLI measurement 512 may be at least one of an L3 RSSI CLI measurement, a dynamic L1 RSSI CLI measurement, or a dynamic L2 RSSI CLI measurement. In aspects, the set of RBs (e.g., 604, 608, 614, 620 in FIG. 6) may include one of (1) less than a total number of RBs configured for a signal strength CLI measurement (e.g., the CLI measurement 512) (e.g., 602, 604, 606, 608,610, 612, 614 in FIG. 6) or (2) at least the total number of RBs configured for a power CLI measurement (e.g., the CLI measurement 512) (e.g., 618, 620 in FIG. 6). In aspects, the set of RBs (e.g., 604, 608, 614, 620 in FIG. 6) may be within a CLI time period (e.g., 710 in FIG. 7) that exceeds a CLI time threshold (e.g., 714 in FIG. 7), as described with respect to FIG. 7. The UE 502 may be configured to provide/transmit, and the base station 504 may be configured to receive, the CLI measurement 512 (e.g., 708 in FIG. 7).

At 904, the UE provides, for the network node, an indication of the obtained CLI measurement. As an example, the provision may be performed, at least in part, by the component 198. FIGS. 5, 6, 7 illustrate an example of the UE 502 providing such a CLI measurement for a network node (e.g., the base station 504).

The UE 502 may be configured to obtain (at 510) a CLI measurement 512 based on a set of RBs (e.g., 604, 608, 614, 620 in FIG. 6) associated with a DL channel from a network node. The UE 502 may be configured to obtain (at 510) the CLI measurement 512 by measuring and/or estimating the CLI 509 on the DL channel. In aspects, the CLI measurement 512 may be at least one of an L3 RSSI CLI measurement, a dynamic L1 RSSI CLI measurement, or a dynamic L2 RSSI CLI measurement. In aspects, the set of RBs (e.g., 604, 608, 614, 620 in FIG. 6) may include one of (1) less than a total number of RBs configured for a signal strength CLI measurement (e.g., the CLI measurement 512) or (2) at least the total number of RBs configured for a power CLI measurement (e.g., the CLI measurement 512). In aspects, the set of RBs (e.g., 604, 608, 614, 620 in FIG. 6) may be within a CLI time period that exceeds a CLI time threshold, as described in further with respect to FIG. 7, by a relaxation time period (e.g., 712 in FIG. 7). The UE 502 may be configured to provide/transmit, and the base station 504 may be configured to receive, the CLI measurement 512.

At 906, the UE receives, from the network node, the TDD configuration or the communication schedule, where the activated TDD slot format is based on the received TDD configuration or the activated communication schedule is based on the received communication schedule. As an example, the reception may be performed, at least in part, by the component 198. FIG. 5 illustrates an example of the UE 502 receiving such a TDD configuration and/or communication schedule from a network node (e.g., the base station 504).

The base station 504 may be configured to configure/generate (at 514), based on the CLI measurement 512 for the UE 502 or another UE (e.g., the UE 503) associated with CLI measurements, a TDD configuration/a communication schedule 516. The TDD configuration/the communication schedule 516 may include a TDD configuration for a TDD slot format. The base station 504 may be configured to provide/transmit the TDD configuration/the communication schedule 516 that is configured/generated (at 514) for the UE 502 (and/or the UE 503, not shown for brevity and clarity of illustration). For instance, the base station 504 may configure/generate (at 514) the TDD configuration/the communication schedule 516 as different semi-static TDD UL-DL slot format configurations or dynamic TDD UL-DL slot formats for UEs in available TDD bands to reduce the CLI 509.

At 908, the UE activates, based on the CLI measurement, a TDD slot format associated with a TDD configuration or a communication schedule from the network node. As an example, the activation may be performed, at least in part, by the component 198. FIG. 5 illustrates an example of the UE 502 activating such a TDD slot format/communication schedule (e.g., based on a configuration/schedule) from a network node (e.g., the base station 504).

The UE 502 may be configured to activate (at 518), based on the CLI measurement 512, a TDD slot format associated with the TDD configuration or the communication schedule 516 from the base station 504 (e.g., a network node). The base station 504 may thus avoid configuring conflicting TDD UL-DL slot formats to the UE 502 and/or the UE 503 based on the CLI measurement 512 (e.g., when indicating a high value for the CLI 509). Otherwise, the base station 504 may configure conflicting TDD UL-DL slot formats to UEs so that spectral efficiency is improved (e.g., when indicating a low value for the CLI 509). Accordingly, spectrum reuse across UEs and full duplexing at base stations is enabled to substantially increase the spectral efficiency of the cell in which the UE 502, the UE 503, and the base station 504 are located.

FIG. 10 is a flowchart 1000 of a method of wireless communication, in various aspects. The method may be performed by a network node such as a base station/gNB (e.g., the base station 102, 404, 504; the network entity 1202, 1302). The method may be performed by a UE (e.g., the UE 104, 402, 502; the apparatus 1204). In some aspects, the method may include aspects described in connection with the communication flow in FIG. 5 and/or aspects described in FIGS. 6, 7. The method provides for CLI measurements by low-tier UEs and enables measuring CLI over a limited number of RBs and/or over relaxed timelines for low-tier UEs to accommodate reduced bandwidth and baseband processing capabilities thereof.

At 1002, the network node receives, from a UE, a CLI measurement based on a set of RBs associated with a DL channel from the network node, where the set of RBs includes one of (1) less than a total number of RBs configured for a signal strength CLI measurement or (2) at least the total number of RBs configured for a power CLI measurement, where the set of RBs is within a CLI time period that exceeds a CLI time threshold. As an example, the reception may be performed, at least in part, by the component 199. FIGS. 5, 6, 7 illustrate an example of the base station 504 receiving such a CLI measurement from a UE (e.g., the UE 502).

The UE 503 may be configured to provide/transmit an UL signal 506 on an UL channel to the base station 504, and the UE 502 may be configured to receive a DL signal 508 on a DL channel from the base station 504. In aspects, the UL signal 506 may cause, or include, CLI 509 with respect to the UE 502 for the DL signal 508 on the DL channel. The UL signal 506 may be provided via a PUSCH, may be a SRS (e.g., 618 in FIG. 6), and/or the like, and the DL signal 508 may be provided via a PDSCH (e.g., 602 in FIG. 6) and/or a CORESET (e.g., 606 in FIG. 6), via both (e.g., 602, 604 in FIG. 6), may be a CLI resource, and/or the like. As noted above, aggressor UEs may provide UL transmissions to network nodes (e.g., base stations, gNBs, and/or the like) that cause the CLI 509 may not be narrowband, and a low-tier, victim UE that is may not be capable of performing CLI measurements of such complexity and/or with a low latency (e.g., an eMBB aggressor UE may transmit a PUSCH in 20 MHz, or a low-tier, aggressor UE may transmit SRS for UL channel sounding in 20 MHz). The UE 502 may be configured to obtain (at 510) a CLI measurement 512 based on a set of RBs (e.g., 604, 608, 614, 620 in FIG. 6) associated with a DL channel from a network node. The UE 502 may be configured to obtain (at 510) the CLI measurement 512 by measuring and/or estimating the CLI 509 on the DL channel. In aspects, the CLI measurement 512 may be at least one of an L3 RSSI CLI measurement, a dynamic L1 RSSI CLI measurement, or a dynamic L2 RSSI CLI measurement. In aspects, the set of RBs (e.g., 604, 608, 614, 620 in FIG. 6) may include one of (1) less than a total number of RBs configured for a signal strength CLI measurement (e.g., the CLI measurement 512) (e.g., 602, 604, 606, 608, 610, 612, 614 in FIG. 6) or (2) at least the total number of RBs configured for a power CLI measurement (e.g., the CLI measurement 512) (e.g., 618, 620 in FIG. 6). In aspects, the set of RBs (e.g., 604, 608, 614, 620 in FIG. 6) may be within a CLI time period (e.g., 710 in FIG. 7) that exceeds a CLI time threshold (e.g., 714 in FIG. 7), as described with respect to FIG. 7, by a relaxation time period (e.g., 712 in FIG. 7). The UE 502 may be configured to provide/transmit, and the base station 504 may be configured to receive, the CLI measurement 512 (e.g., 708 in FIG. 7).

At 1004, the network node configures, based on the CLI measurement for the UE or another UE associated with CLI measurement, a TDD slot format or a communication schedule. As an example, the configuration may be performed, at least in part, by the component 199. FIG. 5 illustrates an example of the base station 504 configuring such a TDD slot format/a communication schedule for a UE (e.g., the UE 502).

The base station 504 may be configured to configure/generate (at 514), based on the CLI measurement 512 for the UE 502 or another UE (e.g., the UE 503) associated with CLI measurements, a TDD configuration/a communication schedule 516. The TDD configuration/the communication schedule 516 may include a TDD configuration for a TDD slot format. The base station 504 may be configured to provide/transmit the TDD configuration/the communication schedule 516 that is configured/generated (at 514) for the UE 502 (and/or the UE 503, not shown for brevity and clarity of illustration). For instance, the base station 504 may configure/generate (at 514) the TDD configuration/the communication schedule 516 as different semi-static TDD UL-DL slot format configurations or dynamic TDD UL-DL slot formats for UEs in available TDD bands to reduce the CLI 509. The UE 502 may be configured to activate (at 518), based on the CLI measurement 512, a TDD slot format associated with the TDD configuration or the communication schedule 516 from the base station 504 (e.g., a network node). The base station 504 may thus avoid configuring conflicting TDD UL-DL slot formats to the UE 502 and/or the UE 503 based on the CLI measurement 512 (e.g., when indicating a high value for the CLI 509). Otherwise, the base station 504 may configure conflicting TDD UL-DL slot formats to UEs so that spectral efficiency is improved (e.g., when indicating a low value for the CLI 509). Accordingly, spectrum reuse across UEs and full duplexing at base stations is enabled to substantially increase the spectral efficiency of the cell in which the UE 502, the UE 503, and the base station 504 are located.

FIG. 11 is a flowchart 1100 of a method of wireless communication, in various aspects. The method may be performed by a base station/gNB (e.g., the base station 102, 404, 504; the network entity 1202, 1302). The method may be performed by a UE (e.g., the UE 104, 402, 502; the apparatus 1204). In some aspects, the method may include aspects described in connection with the communication flow in FIG. 5 and/or aspects described in FIGS. 6, 7. The method provides for CLI measurements by low-tier UEs and enables measuring CLI over a limited number of RBs and/or over relaxed timelines for low-tier UEs to accommodate reduced bandwidth and baseband processing capabilities thereof.

At 1102, the network node provides, for the UE, at least one DL signal, associated with the CLI measurement, that includes a set of RBs. As an example, the provision may be performed, at least in part, by the component 199. FIGS. 5, 6 illustrate an example of the base station 504 providing such a DL signal for a UE (e.g., the UE 502).

The UE 503 may be configured to provide/transmit an UL signal 506 on an UL channel to the base station 504, and the UE 502 may be configured to receive a DL signal 508 on a DL channel from the base station 504. In aspects, the UL signal 506 may cause, or include, CLI 509 with respect to the UE 502 for the DL signal 508 on the DL channel. The UL signal 506 may be provided via a PUSCH, may be a SRS (e.g., 618 in FIG. 6), and/or the like, and the DL signal 508 may be provided via a PDSCH (e.g., 602 in FIG. 6) and/or a CORESET (e.g., 606 in FIG. 6), via both (e.g., 602, 604 in FIG. 6), may be a CLI resource, and/or the like.

At 1104, the network node receives, from a UE, a CLI measurement based on a set of RBs associated with a DL channel from the network node, where the set of RBs includes one of (1) less than a total number of RBs configured for a signal strength CLI measurement or (2) at least the total number of RBs configured for a power CLI measurement, where the set of RBs is within a CLI time period that exceeds a CLI time threshold. As an example, the reception may be performed, at least in part, by the component 199. FIGS. 5, 6, 7 illustrate an example of the base station 504 receiving such a CLI measurement from a UE (e.g., the UE 502).

As noted above, aggressor UEs may provide UL transmissions to network nodes (e.g., base stations, gNBs, and/or the like) that cause the CLI 509 may not be narrowband, and a low-tier, victim UE that is may not be capable of performing CLI measurements of such complexity and/or with a low latency (e.g., an eMBB aggressor UE may transmit a PUSCH in 20 MHz, or a low-tier, aggressor UE may transmit SRS for UL channel sounding in 20 MHz). The UE 502 may be configured to obtain (at 510) a CLI measurement 512 based on a set of RBs (e.g., 604, 608, 614, 620 in FIG. 6) associated with a DL channel from a network node. The UE 502 may be configured to obtain (at 510) the CLI measurement 512 by measuring and/or estimating the CLI 509 on the DL channel. In aspects, the CLI measurement 512 may be at least one of an L3 RSSI CLI measurement, a dynamic L1 RSSI CLI measurement, or a dynamic L2 RSSI CLI measurement. In aspects, the set of RBs (e.g., 604, 608, 614, 620 in FIG. 6) may include one of (1) less than a total number of RBs configured for a signal strength CLI measurement (e.g., the CLI measurement 512) (e.g., 602, 604, 606, 608, 610, 612, 614 in FIG. 6) or (2) at least the total number of RBs configured for a power CLI measurement (e.g., the CLI measurement 512) (e.g., 618, 620 in FIG. 6). In aspects, the set of RBs (e.g., 604, 608, 614, 620 in FIG. 6) may be within a CLI time period (e.g., 710 in FIG. 7) that exceeds a CLI time threshold (e.g., 714 in FIG. 7), as described with respect to FIG. 7, by a relaxation time period (e.g., 712 in FIG. 7). The UE 502 may be configured to provide/transmit, and the base station 504 may be configured to receive, the CLI measurement 512 (e.g., 708 in FIG. 7).

At 1106, the network node configures, based on the CLI measurement for the UE or another UE associated with CLI measurement, a TDD slot format or a communication schedule. As an example, the configuration may be performed, at least in part, by the component 199. FIG. 5 illustrates an example of the base station 504 configuring such a TDD slot format/a communication schedule for a UE (e.g., the UE 502).

The base station 504 may be configured to configure/generate (at 514), based on the CLI measurement 512 for the UE 502 or another UE (e.g., the UE 503) associated with CLI measurements, a TDD configuration/a communication schedule 516. The TDD configuration/the communication schedule 516 may include a TDD configuration for a TDD slot format. For instance, the base station 504 may configure/generate (at 514) the TDD configuration/the communication schedule 516 as different semi-static TDD UL-DL slot format configurations or dynamic TDD UL-DL slot formats for UEs in available TDD bands to reduce the CLI 509. The UE 502 may be configured to activate (at 518), based on the CLI measurement 512, a TDD slot format associated with the TDD configuration or the communication schedule 516 from the base station 504 (e.g., a network node). The base station 504 may thus avoid configuring conflicting TDD UL-DL slot formats to the UE 502 and/or the UE 503 based on the CLI measurement 512 (e.g., when indicating a high value for the CLI 509). Otherwise, the base station 504 may configure conflicting TDD UL-DL slot formats to UEs so that spectral efficiency is improved (e.g., when indicating a low value for the CLI 509). Accordingly, spectrum reuse across UEs and full duplexing at base stations is enabled to substantially increase the spectral efficiency of the cell in which the UE 502, the UE 503, and the base station 504 are located. At 1108, the network node provides, for the UE, a TDD configuration or the communication schedule, where the configured TDD slot format is based on the provided TDD configuration or the configured communication schedule is based on the provided communication schedule. As an example, the provision may be performed, at least in part, by the component 199. FIG. 5 illustrates an example of the base station 504 providing such a configuration/schedule for a UE (e.g., the UE 502).

The base station 504 may be configured to provide/transmit the TDD configuration/the communication schedule 516 that is configured/generated (at 514) for the UE 502 (and/or the UE 503, not shown for brevity and clarity of illustration). For instance, the base station 504 may configure/generate (at 514) the TDD configuration/the communication schedule 516 as different semi-static TDD UL-DL slot format configurations or dynamic TDD UL-DL slot formats for UEs in available TDD bands to reduce the CLI 509. The UE 502 may be configured to activate (at 518), based on the CLI measurement 512, a TDD slot format associated with the TDD configuration or the communication schedule 516 from the base station 504 (e.g., a network node). The base station 504 may thus avoid configuring conflicting TDD UL-DL slot formats to the UE 502 and/or the UE 503 based on the CLI measurement 512 (e.g., when indicating a high value for the CLI 509). Otherwise, the base station 504 may configure conflicting TDD UL-DL slot formats to UEs so that spectral efficiency is improved (e.g., when indicating a low value for the CLI 509). Accordingly, spectrum reuse across UEs and full duplexing at base stations is enabled to substantially increase the spectral efficiency of the cell in which the UE 502, the UE 503, and the base station 504 are located.

Figure 12:
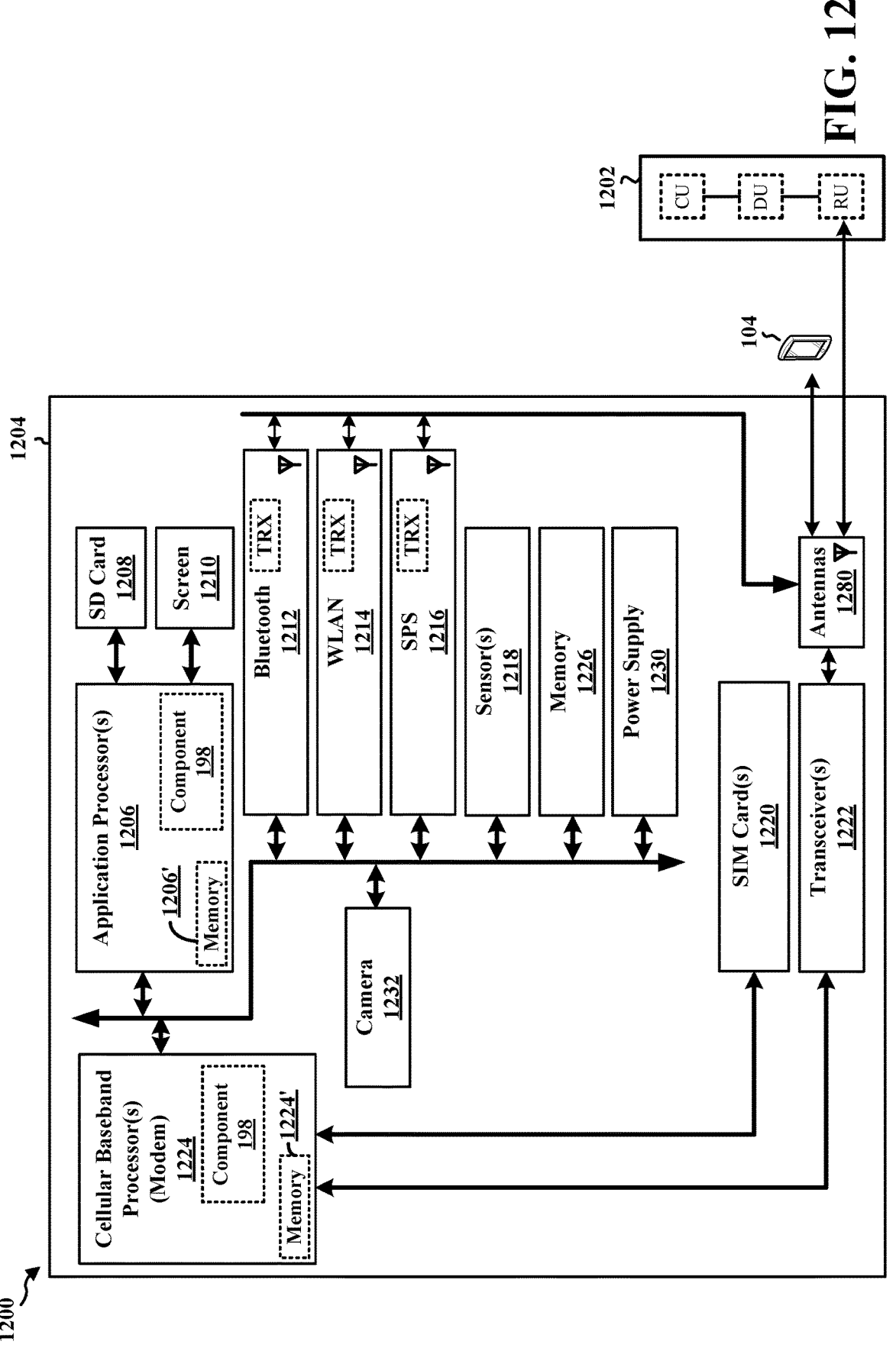
FIG. 12 is a diagram illustrating an example of a hardware implementation for an example apparatus and/or network entity.

FIG. 12 is a diagram 1200 illustrating an example of a hardware implementation for an apparatus 1204. The apparatus 1204 may be a UE, a component of a UE, or may implement UE functionality. In some aspects, the apparatus 1204 may include at least one cellular baseband processor 1224 (also referred to as a modem) coupled to one or more transceivers 1222 (e.g., cellular RF transceiver). The cellular baseband processor(s) 1224 may include at least one on-chip memory 1224'. In some aspects, the apparatus 1204 may further include one or more subscriber identity modules (SIM) cards 1220 and at least one application processor 1206 coupled to a secure digital (SD) card 1208 and a screen 1210. The application processor(s) 1206 may include on-chip memory 1206'. In some aspects, the apparatus 1204 may further include a Bluetooth module 1212, a WLAN module 1214, an SPS module 1216 (e.g., GNSS module), one or more sensor modules 1218 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1226, a power supply 1230, and/or a camera 1232. The Bluetooth module 1212, the WLAN module 1214, and the SPS module 1216 may include an on-chip transceiver (TRX) (or in some cases, just a receiver (RX)). The Bluetooth module 1212, the WLAN module 1214, and the SPS module 1216 may include their own dedicated antennas and/or utilize the antennas 1280 for communication. The cellular baseband processor(s) 1224 communicates through the transceiver(s) 1222 via one or more antennas 1280 with the UE 104 and/or with an RU associated with a network entity 1202. The cellular baseband processor(s) 1224 and the application processor(s) 1206 may each include a computer-readable medium/memory 1224', 1206', respectively. The additional memory modules 1226 may also be considered a computer-readable medium/memory. Each computer-readable medium/memory 1224', 1206', 1226 may be non-transitory. The cellular baseband processor(s) 1224 and the application processor(s) 1206 are each responsible for general processing, including the execution of software stored on the computer-readable medium/memory. The software, when executed by the cellular baseband processor(s) 1224/application processor(s) 1206, causes the cellular baseband processor(s) 1224/application processor(s) 1206 to perform the various functions described supra. The computer-readable medium/memory may also be used for storing data that is manipulated by the cellular baseband processor(s) 1224/application processor(s) 1206 when executing software. The cellular baseband processor(s) 1224/application processor(s) 1206 may be a component of the UE 350 and may include the at least one memory 360 and/or at least one of the TX processor 368, the RX processor 356, and the controller/processor 359. In one configuration, the apparatus 1204 may be at least one processor chip (modem and/or application) and include just the cellular baseband processor(s) 1224 and/or the application processor(s) 1206, and in another configuration, the apparatus 1204 may be the entire UE (e.g., see UE 350 of FIG. 3) and include the additional modules of the apparatus 1204.

As discussed supra, the component 198 may be config-ured to obtain a CLI measurement based on a set of RBs associated with a DL channel from a network node, where the set of RBs includes one of (1) less than a total number of RBs configured for a signal strength CLI measurement or (2) at least the total number of RBs configured for a power CLI measurement, where the set of RBs is within a CLI time period that exceeds a CLI time threshold. The component 198 may also be configured to activate, based on the CLI measurement, a TDD slot format associated with a TDD configuration or a communication schedule from the net-work node. The component 198 may be configured to provide, for the network node, an indication of the obtained CLI measurement. The component 198 may be configured to receive, from the network node, the TDD configuration or the communication schedule, where the activated TDD slot format is based on the received TDD configuration or the activated communication schedule is based on the received communication schedule. The component 198 may be fur-ther configured to perform any of the aspects described in connection with the flowcharts in any of FIGS. 8-11, and/or any of the aspects performed by a UE for any of FIGS. 5-7. The component 198 may be within the cellular baseband processor(s) 1224, the application processor(s) 1206, or both the cellular baseband processor(s) 1224 and the application processor(s) 1206. The component 198 may be one or more hardware components specifically configured to carry out the stated processes/algorithm, implemented by one or more processors configured to perform the stated processes/algo-rithm, stored within a computer-readable medium for imple-mentation by one or more processors, or some combination thereof. When multiple processors are implemented, the multiple processors may perform the stated processes/algo-rithm individually or in combination. As shown, the appa-ratus 1204 may include a variety of components configured for various functions. In one configuration, the apparatus 1204, and in particular the cellular baseband processor(s) 1224 and/or the application processor(s) 1206, may include means for obtaining a CLI measurement based on a set of RBs associated with a DL channel from a network node, where the set of RBs includes one of (1) less than a total number of RBs configured for a signal strength CLI mea-surement or (2) at least the total number of RBs configured for a power CLI measurement, where the set of RBs is within a CLI time period that exceeds a CLI time threshold. In the configuration, the apparatus 1204, and in particular the cellular baseband processor(s) 1224 and/or the applica-tion processor(s) 1206, may include means for activating, based on the CLI measurement, a TDD slot format associ-ated with a TDD configuration or a communication schedule from the network node. In one configuration, the apparatus 1204, and in particular the cellular baseband processor(s) 1224 and/or the application processor(s) 1206, may include means for providing, for the network node, an indication of the obtained CLI measurement. In one configuration, the apparatus 1204, and in particular the cellular baseband processor(s) 1224 and/or the application processor(s) 1206, may include means for receiving, from the network node, the TDD configuration or the communication schedule, where the activated TDD slot format is based on the received TDD configuration or the activated communication schedule is based on the received communication schedule. The means may be the component 198 of the apparatus 1204 configured to perform the functions recited by the means. As described supra, the apparatus 1204 may include the TX processor 368, the RX processor 356, and the controller/processor 359. As such, in one configuration, the means may be the TX processor 368, the RX processor 356, and/or the controller/processor 359 configured to perform the functions recited by the means.

Figure 13:
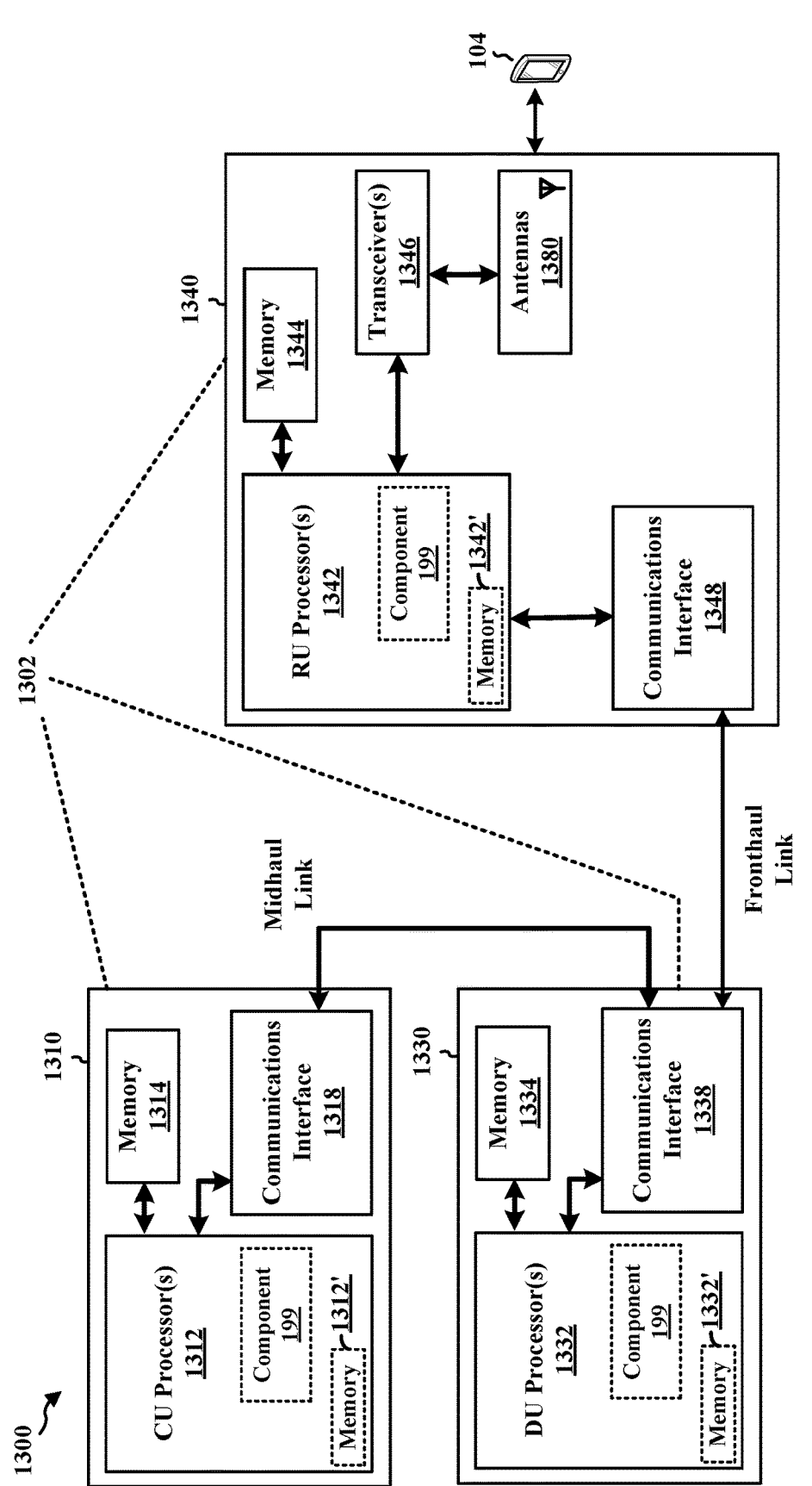
FIG. 13 is a diagram illustrating an example of a hardware implementation for an example network entity.

FIG. 13 is a diagram 1300 illustrating an example of a hardware implementation for a network entity 1302. The network entity 1302 may be a BS, a component of a BS, or may implement BS functionality. The network entity 1302 may include at least one of a CU 1310, a DU 1330, or an RU 1340. For example, depending on the layer functionality handled by the component 199, the network entity 1302 may include the CU 1310; both the CU 1310 and the DU 1330; each of the CU 1310, the DU 1330, and the RU 1340; the DU 1330; both the DU 1330 and the RU 1340; or the RU 1340. The CU 1310 may include at least one CU processor 1312. The CU processor(s) 1312 may include on-chip memory 1312'. In some aspects, the CU 1310 may further include additional memory modules 1314 and a communi-cations interface 1318. The CU 1310 communicates with the DU 1330 through a midhaul link, such as an F1 interface. The DU 1330 may include at least one DU processor 1332. The DU processor(s) 1332 may include on-chip memory 1332'. In some aspects, the DU 1330 may further include additional memory modules 1334 and a communications interface 1338. The DU 1330 communicates with the RU 1340 through a fronthaul link. The RU 1340 may include at least one RU processor 1342. The RU processor(s) 1342 may include on-chip memory 1342'. In some aspects, the RU 1340 may further include additional memory modules 1344, one or more transceivers 1346, antennas 1380, and a com-munications interface 1348. The RU 1340 communicates with the UE 104. The on-chip memory 1312', 1332', 1342' and the additional memory modules 1314, 1334, 1344 may each be considered a computer-readable medium/memory. Each computer-readable medium/memory may be non-tran-sitory. Each of the processors 1312, 1332, 1342 is respon-sible for general processing, including the execution of software stored on the computer-readable medium/memory. The software, when executed by the corresponding proces-sor(s) causes the processor(s) to perform the various func-tions described supra. The computer-readable medium/memory may also be used for storing data that is manipulated by the processor(s) when executing software.

As discussed supra, the component 199 may be config-ured to receive, from a UE, a CLI measurement based on a set of RBs associated with a DL channel from the network node, where the set of RBs includes one of (1) less than a total number of RBs configured for a signal strength CLI measurement or (2) at least the total number of RBs con-figured for a power CLI measurement, where the set of RBs is within a CLI time period that exceeds a CLI time threshold. The component 199 may also be configured to configure, based on the CLI measurement for the UE or another UE associated with CLI measurements, a TDD slot format or a communication schedule. The component 199 may be configured to provide, for the UE, at least one DL signal, associated with the CLI measurement, that includes the set of RBs. The component 199 may be configured to provide, for the UE, the TDD configuration or the commu-nication schedule, where the configured TDD slot format is based on the provided TDD configuration or the configured communication schedule is based on the provided commu-nication schedule. The component 199 may be further configured to perform any of the aspects described in connection with the flowcharts in any of FIGS. 8-11, and/or any of the aspects performed by a UE for any of FIGS. 5-7. The component 199 may be within one or more processors of one or more of the CU 1310, DU 1330, and the RU 1340.

The component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 1302 may include a variety of components configured for various functions. In one configuration, the network entity 1302 may include means for receiving, from a UE, a CLI measurement based on a set of RBs associated with a DL channel from the network node, where the set of RBs includes one of (1) less than a total number of RBs configured for a signal strength CLI measurement or (2) at least the total number of RBs configured for a power CLI measurement, where the set of RBs is within a CLI time period that exceeds a CLI time threshold. In the configuration, the network entity 1302 may include means for configuring, based on the CLI measurement for the UE or another UE associated with CLI measurements, a TDD slot format or a communication schedule. In one configuration, the network entity 1302 may include means for providing, for the UE, at least one DL signal, associated with the CLI measurement, that includes the set of RBs. In one configuration, the network entity 1302 may include means for providing, for the UE, the TDD configuration or the communication schedule, where the configured TDD slot format is based on the provided TDD configuration or the configured communication schedule is based on the provided communication schedule. The means may be the component 199 of the network entity 1302 configured to perform the functions recited by the means. As described supra, the network entity 1302 may include the TX processor 316, the RX processor 370, and the controller/processor 375. As such, in one configuration, the means may be the TX processor 316, the RX processor 370, and/or the controller/processor 375 configured to perform the functions recited by the means.

CLI measurements may measure inter-UE interference, from an aggressor/interfering UE, to the DL serving cell reception of a victim UE. For enhanced mobile broadband eMBB UEs, as well as other premium UEs such as URLLC UEs, cellular V2X UEs, etc., 5G NR networks may allow for a victim UE to use the received beam of the last received PDSCH or a monitored PDCCH to measure CLI. With mid-tier UEs, such as RedCap UEs for wearables, industrial IoT, and surveillance camera use cases, wireless communication networks may relax peak throughput, latency, and reliability characteristics, e.g., as compared to eMBB UEs, for various functions. However, low-tier UEs, such eRedCap UEs, may have further reduced hardware capabilities that allow a restricted number of PRBs to be processed in each slot. Yet, low-tier UEs may benefit from performance of CLI measurements to facilitate spectrum reuse across UEs, however the complexity and/or latency of such measurements, e.g., as performed in premium or mid-tier UEs may be of a higher complexity/shorter latency than can be accomplished by low-tier UEs, such eRedCap UEs. For instance, the UL transmission from an aggressor UE that causes the CLI may not be narrowband, and a victim UE that is low-tier may not be capable of performing CLI measurements of such complexity and/or with a low latency (e.g., an eMBB aggressor UE may transmit a PUSCH in 20 MHz, or an eRedCap aggressor UE may transmit SRS for UL channel sounding in 20 MHz).

Various aspects herein for cross link interference measurements by low-tier UEs may enable a low-tier UE to perform CLI measurements on UL transmissions from an aggressor UE that are outside of the bandwidth capabilities for low-tier UEs by reducing the maximum number of RBs to measure for CLI measurements on each CLI measurement occasion. Various aspect may also enable a low-tier UE to timely perform CLI measurements by relaxing the minimum processing time of CLI measurements for each CLI measurement occasion. Various aspect may also enable a low-tier UE facilitate spectrum reuse across UEs by reducing the complexity of CLI measurements.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B. A and C, B and C, or A and B and C, where any such combinations may contain one or more member or members of A, B, or C. Sets should be interpreted as a set of elements where the elements number one or more. Accordingly, for a set of X. X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a user equipment (UE), comprising: obtaining a cross link interference (CLI) measurement based on a set of resource blocks (RBs) associated with a downlink (DL) channel from a network node, wherein the set of RBs includes one of (1) less than a total number of RBs configured for a signal strength CLI measurement or (2) at least the total number of RBs configured for a power CLI measurement, wherein the set of RBs is within a CLI time period that exceeds a CLI time threshold; and activating, based on the CLI measurement, a time division duplex (TDD) slot format associated with a TDD configuration or a communication schedule from the network node.

Aspect 2 is the method of aspect 1, wherein the CLI time period is a measurement and reporting CLI time period that is configured by the network node for one or more high-function UEs, wherein the CLI time threshold is a measurement and reporting CLI time threshold that is configured by the network node.

Aspect 3 is the method of any of aspects 1 and 2, wherein the set of RBs is scheduled for a most recent physical downlink shared channel (PDSCH) assigned for the UE.

Aspect 4 is the method of aspect 3, wherein the set of RBs includes at least one of: a first number of RBs that is less than or equal to 25 physical RBs (PRBs), wherein a subcarrier spacing (SCS), for a CLI measurement occasion over the set of RBs, is 15 kHz; or a second number of RBs that is less than or equal to 11 PRBs, wherein the subcarrier spacing (SCS), for the CLI measurement occasion over the set of RBs, is 30 KHz.

Aspect 5 is the method of any of aspects 1 and 2, wherein the set of RBs is scheduled for a most recently monitored control resource set (CORESET) associated with the UE.

Aspect 6 is the method of any of aspects 1 and 2, wherein the set of RBs is included in an overlapped set of contiguous physical RBs (PRBs) between a resource that corresponds to the CLI and at least one of (i) a most recent physical downlink shared channel (PDSCH) assigned for the UE or (ii) a most recently monitored control resource set (CORESET) associated with the UE.

Aspect 7 is the method of any of aspects 1 to 7, further comprising: providing, for the network node, an indication of the obtained CLI measurement; and receiving, from the network node, the TDD configuration or the communication schedule, wherein the activated TDD slot format is based on the received TDD configuration or the activated communication schedule is based on the received communication schedule.

Aspect 8 is the method of any of aspects 1 to 7, wherein obtaining the CLI measurement comprises at least one of measuring the CLI measurement or estimating the CLI measurement.

Aspect 9 is the method of aspect 8, wherein the CLI measurement is at least one of a layer 3 (L3) received signal strength indicator (RSSI) CLI measurement, a dynamic layer 1 (L1) RSSI CLI measurement, or a dynamic layer 2 (L2) RSSI CLI measurement.

Aspect 10 is the method of any of aspects 1 to 2 and 7 to 9, wherein the set of RBs includes at least the total number of RBs configured for a slot of the DL channel, wherein the CLI measurement is a CLI sounding reference signal (SRS) measurement, and wherein obtaining the CLI SRS measurement includes at least one of (i) obtaining the CLI SRS measurement within an entirety of a radio frequency (RF) bandwidth, of the UE, associated with a relaxed measurement timeline for an enhanced reduced capability UE, or (ii) obtaining the CLI SRS measurement on at least one of a first number of RBs that is larger than 25 physical RBs (PRBs) and is associated with the relaxed measurement timeline for the enhanced reduced capability UE, wherein a subcarrier spacing (SCS), for the CLI SRS measurement occasion over the set of RBs, is 15 kHz, or a second number of RBs that is larger than 11 PRBs and is associated with the relaxed measurement timeline for the enhanced reduced capability UE, where the SCS, for the CLI SRS measurement occasion over the set of RBs, is 30 kHz.

Aspect 11 is the method of aspect 10, wherein the relaxed measurement timeline includes: a baseline time period between at least one of (i) a first end of downlink control information (DCI) that indicates performance of the CLI measurement and a provision of the CLI measurement for the network node, (ii) a second end of a resource that corresponds to the CLI SRS measurement and the provision of the CLI measurement for the network node, or (iii) the first end of the DCI that indicates performance of the CLI measurement and the resource that corresponds to the CLI SRS measurement; and a relaxation time period that is based on a number of RBs associated with the SRS or associated with the entirety of the RF bandwidth.

Aspect 12 is the method of aspect 11, wherein the relaxation time period is further based on a subcarrier spacing (SCS) associated with the UE.

Aspect 13 is the method of any of aspects 1 to 12, wherein the UE is an enhanced reduced capability UE configured for at least one Internet of Things (IoT) functionality.

Aspect 14 is a method of wireless communication at a network node, comprising: receiving, from a user equipment (UE), a cross link interference (CLI) measurement based on a set of resource blocks (RBs) associated with a downlink (DL) channel from the network node, wherein the set of RBs includes one of (1) less than a total number of RBs configured for a signal strength CLI measurement or (2) at least the total number of RBs configured for a power CLI measurement, wherein the set of RBs is within a CLI time period that exceeds a CLI time threshold; and configuring, based on the CLI measurement for the UE or another UE associated with CLI measurements, a time division duplex (TDD) slot format or a communication schedule.

Aspect 15 is the method of aspect 14, wherein the CLI time period is a measurement and reporting CLI time period that is configured by the network node for one or more high-function UEs, wherein the CLI time threshold is a measurement and reporting CLI time threshold that is configured by the network node.

Aspect 16 is the method of any of aspects 14 and 15, wherein the set of RBs is scheduled for a most recent physical downlink shared channel (PDSCH) assigned for the UE.

Aspect 17 is the method of aspect 16, wherein the set of RBs includes at least one of: a first number of RBs that is less than or equal to 25 physical RBs (PRBs), wherein a subcarrier spacing (SCS), for a CLI measurement occasion over the set of RBs, is 15 kHz; or a second number of RBs that is less than or equal to 11 PRBs, wherein the subcarrier spacing (SCS), for the CLI measurement occasion over the set of RBs, is 30 KHz.

Aspect 18 is the method of any of aspects 14 and 15, wherein the set of RBs is scheduled for a most recently monitored control resource set (CORESET) associated with the UE.

Aspect 19 is the method of any of aspects 14 and 15, wherein the set of RBs is included in an overlapped set of contiguous physical RBs (PRBs) between a resource that corresponds to the CLI and at least one of (i) a most recent physical downlink shared channel (PDSCH) assigned for the UE or (ii) a most recently monitored control resource set (CORESET) associated with the UE.

Aspect 20 is the method of any of aspects 14 to 19, further comprising: providing, for the UE, at least one DL signal, associated with the CLI measurement, that includes the set of RBs; and providing, for the UE, a TDD configuration or the communication schedule, wherein the configured TDD slot format is based on the provided TDD configuration or the configured communication schedule is based on the provided communication schedule.

Aspect 21 is the method of any of aspects 14 to 20, wherein receiving the CLI measurement comprises receiving an estimate of the CLI measurement.

Aspect 22 is the method of aspect 21, wherein the CLI measurement is at least one of a layer 3 (L3) received signal strength indicator (RSSI) CLI measurement, a dynamic layer 1 (L1) RSSI CLI measurement, or a dynamic layer 2 (L2) RSSI CLI measurement.

Aspect 23 is the method of any of aspects 14 to 15 and 20 to 22, wherein the set of RBs includes at least the total number of RBs configured for a slot of the DL channel, wherein the CLI measurement is a CLI sounding reference signal (SRS) measurement, and wherein the CLI SRS measurement is based on at least one of: the CLI SRS measurement within an entirety of a radio frequency (RF) bandwidth, of the UE, associated with a relaxed measurement timeline for an enhanced reduced capability UE; or the CLI SRS measurement on at least one of: a first number of RBs that is larger than 25 physical RBs (PRBs) and is associated with the relaxed measurement timeline for the enhanced reduced capability UE, wherein a subcarrier spacing (SCS), for the CLI SRS measurement occasion over the set of RBs, is 15 kHz, or a second number of RBs that is larger than 11 PRBs and is associated with the relaxed measurement timeline for the enhanced reduced capability UE, where the SCS, for the CLI SRS measurement occasion over the set of RBs, is 30 KHz.

Aspect 24 is the method of aspect 23, wherein the relaxed measurement timeline includes: a baseline time period between at least one of (i) a first end of downlink control information (DCI) that indicates performance of the CLI measurement and a provision of the CLI measurement for the network node, (ii) a second end of a resource that corresponds to the CLI SRS measurement and the provision of the CLI measurement for the network node, or (iii) the first end of the DCI that indicates performance of the CLI measurement and the resource that corresponds to the CLI SRS measurement; and a relaxation time period that is based on a number of RBs associated with the SRS or associated with the entirety of the RF bandwidth.

Aspect 25 is the method of aspect 24, wherein the relaxation time period is further based on a subcarrier spacing (SCS) associated with the UE.

Aspect 26 is the method of any of aspects 14 to 25, wherein the UE is an enhanced reduced capability UE configured for at least one Internet of Things (IoT) functionality.

Aspect 27 is an apparatus for wireless communication including means for implementing any of aspects 1 to 13.

Aspect 28 is a computer-readable medium (e.g., a non-transitory computer-readable medium) storing computer executable code, the code when executed by at least one processor causes the at least one processor to implement any of aspects 1 to 13.

Aspect 29 is an apparatus for wireless communication at a UE. The apparatus includes a memory; and at least one processor coupled to the memory and, based at least in part on information stored in the memory, the at least one processor, individually or in any combination, is configured to implement any of aspects 1 to 13.

Aspect 30 is the apparatus of aspect 31, further including at least one of a transceiver or an antenna coupled to the at least one processor.

Aspect 31 is an apparatus for wireless communication including means for implementing any of aspects 14 to 26.

Aspect 32 is a computer-readable medium (e.g., a non-transitory computer-readable medium) storing computer executable code, the code when executed by at least one processor causes the at least one processor to implement any of aspects 14 to 26.

Aspect 33 is an apparatus for wireless communication at a network node. The apparatus includes a memory; and at least one processor coupled to the memory and, based at least in part on information stored in the memory, the at least one processor, individually or in any combination, is configured to implement any of aspects 14 to 26.

Aspect 34 is the apparatus of aspect 33, further including at least one of a transceiver or an antenna coupled to the at least one processor.

What is claimed is:

1. An apparatus for wireless communication at a user equipment (UE), comprising:
   at least one memory; and
   at least one processor coupled to the at least one memory and, based at least in part on information stored in the at least one memory, the at least one processor being configured to:
   obtain a cross link interference (CLI) measurement based on a set of resource blocks (RBs) associated with a downlink (DL) channel from a network node, wherein the set of RBs includes one of (1) less than a total number of RBs configured for a signal strength CLI measurement or (2) at least the total number of RBs configured for a power CLI measurement, wherein the set of RBs is within a CLI time period that exceeds a CLI time threshold; and activate, based on the CLI measurement, a time division duplex (TDD) slot format associated with a TDD configuration or a communication schedule from the network node.

2. The apparatus of claim 1, wherein the CLI time period is a measurement and reporting CLI time period that is configured by the network node for one or high-function UEs, wherein the CLI time threshold is a measurement and reporting CLI time threshold that is configured by the network node.

3. The apparatus of claim 1, wherein the set of RBs is scheduled for a most recent physical downlink shared channel (PDSCH) assigned for the UE.

4. The apparatus of claim 3, wherein the set of RBs includes at least one of:

a first number of RBs that is less than or equal to 25 physical RBs (PRBs), wherein a subcarrier spacing (SCS), for a CLI measurement occasion over the set of RBs, is 15 kHz; or a second number of RBs that is less than or equal to 11 PRBs, wherein the subcarrier spacing (SCS), for the CLI measurement occasion over the set of RBs, is 30 kHz.

5. The apparatus of claim 1, wherein the set of RBs is scheduled for a most recently monitored control resource set (CORESET) associated with the UE.

6. The apparatus of claim 1, wherein the set of RBs is included in an overlapped set of contiguous physical RBs (PRBs) between a resource that corresponds to the CLI and at least one of (i) a most recent physical downlink shared channel (PDSCH) assigned for the UE or (ii) a most recently monitored control resource set (CORESET) associated with the UE.

7. The apparatus of claim 1, wherein the at least one processor is further configured to:

provide, for the network node, an indication of the obtained CLI measurement; and receive, from the network node, the TDD configuration or the communication schedule, wherein the activated TDD slot format is based on the received TDD configuration or the activated communication schedule is based on the received communication schedule.

8. The apparatus of claim 1, wherein to obtain the CLI measurement, the at least one processor is configured to measure the CLI measurement or estimate the CLI measurement.

9. The apparatus of claim 8, wherein the CLI measurement is at least one of a layer 3 (L3) received signal strength indicator (RSSI) CLI measurement, a dynamic layer 1 (L1) RSSI CLI measurement, or a dynamic layer 2 (L2) RSSI CLI measurement.

10. The apparatus of claim 1, wherein the set of RBs includes at least the total number of RBs configured for a slot of the DL channel, wherein the CLI measurement is a CLI sounding reference signal (SRS) measurement, and wherein to obtain the CLI SRS measurement, the at least one processor is configured to perform at least one of:

obtain the CLI SRS measurement within an entirety of a radio frequency (RF) bandwidth, of the UE, associated with a relaxed measurement timeline for an enhanced reduced capability UE; or obtain the CLI SRS measurement on at least one of:

a first number of RBs that is larger than 25 physical RBs (PRBs) and is associated with the relaxed measurement timeline for the enhanced reduced capability UE, wherein a subcarrier spacing (SCS), for the CLI SRS measurement occasion over the set of RBs, is 15 kHz, or a second number of RBs that is larger than 11 PRBs and is associated with the relaxed measurement timeline for the enhanced reduced capability UE, where the SCS, for the CLI SRS measurement occasion over the set of RBs, is 30 KHz.

11. The apparatus of claim 10, wherein the relaxed measurement timeline includes:

a baseline time period between at least one of (i) a first end of downlink control information (DCI) that indicates performance of the CLI measurement and a provision of the CLI measurement for the network node, (ii) a second end of a resource that corresponds to the CLI SRS measurement and the provision of the CLI measurement for the network node, or (iii) the first end of the DCI that indicates performance of the CLI measurement and the resource that corresponds to the CLI SRS measurement; and a relaxation time period that is based on a number of RBs associated with the SRS or associated with the entirety of the RF bandwidth.

12. The apparatus of claim 11, wherein the relaxation time period is further based on a subcarrier spacing (SCS) associated with the UE.

13. The apparatus of claim 1, wherein the UE is an enhanced reduced capability UE configured for at least one Internet of Things (IoT) functionality.

14. An apparatus for wireless communication at a network node, comprising:

at least one memory; and at least one processor coupled to the at least one memory and, based at least in part on information stored in the at least one memory, the at least one processor being is configured to:

receive, from a user equipment (UE), a cross link interference (CLI) measurement based on a set of resource blocks (RBs) associated with a downlink (DL) channel from the network node, wherein the set of RBs includes one of (1) less than a total number of RBs configured for a signal strength CLI measurement or (2) at least the total number of RBs configured for a power CLI measurement, wherein the set of RBs is within a CLI time period that exceeds a CLI time threshold; and configure, based on the CLI measurement for the UE or another UE associated with CLI measurements, a time division duplex (TDD) slot format or a communication schedule.

15. The apparatus of claim 14, wherein the CLI time period is a measurement and reporting CLI time period that is configured by the network node for one or more high-function UEs, wherein the CLI time threshold is a measurement and reporting CLI time threshold that is configured by the network node.

16. The apparatus of claim 14, wherein the set of RBs is scheduled for a most recent physical downlink shared channel (PDSCH) assigned for the UE.

17. The apparatus of claim 16, wherein the set of RBs includes at least one of:

a first number of RBs that is less than or equal to 25 physical RBs (PRBs), wherein a subcarrier spacing (SCS), for a CLI measurement occasion over the set of RBs, is 15 kHz; or a second number of RBs that is less than or equal to 11 PRBs, wherein the subcarrier spacing (SCS), for the CLI measurement occasion over the set of RBs, is 30 KHz.

18. The apparatus of claim 14, wherein the set of RBs is scheduled for a most recently monitored control resource set (CORESET) associated with the UE.

19. The apparatus of claim 14, wherein the set of RBs is included in an overlapped set of contiguous physical RBs (PRBs) between a resource that corresponds to the CLI and at least one of (i) a most recent physical downlink shared channel (PDSCH) assigned for the UE or (ii) a most recently monitored control resource set (CORESET) associated with the UE.

20. The apparatus of claim 14, wherein the at least one processor is further configured to:

provide, for the UE, at least one DL signal, associated with the CLI measurement, that includes the set of RBs; and provide, for the UE, a TDD configuration or the communication schedule, wherein the configured TDD slot format is based on the provided TDD configuration or the configured communication schedule is based on the provided communication schedule.

21. The apparatus of claim 14, wherein to receive the CLI measurement, the at least one processor is configured to receive an estimate of the CLI measurement.

22. The apparatus of claim 21, wherein the CLI measurement is at least one of a layer 3 (L3) received signal strength indicator (RSSI) CLI measurement, a dynamic layer 1 (L1) RSSI CLI measurement, or a dynamic layer 2 (L2) RSSI CLI measurement.

23. The apparatus of claim 14, wherein the set of RBs includes at least the total number of RBs configured for a slot of the DL channel, wherein the CLI measurement is a CLI sounding reference signal (SRS) measurement, and wherein the CLI SRS measurement is based on at least one of:

the CLI SRS measurement within an entirety of a radio frequency (RF) bandwidth, of the UE, associated with a relaxed measurement timeline for an enhanced reduced capability UE; or the CLI SRS measurement on at least one of:

a first number of RBs that is larger than 25 physical RBs (PRBs) and is associated with the relaxed measurement timeline for the enhanced reduced capability UE, wherein a subcarrier spacing (SCS), for the CLI SRS measurement occasion over the set of RBs, is 15 kHz, or a second number of RBs that is larger than 11 PRBs and is associated with the relaxed measurement timeline for the enhanced reduced capability UE, where the SCS, for the CLI SRS measurement occasion over the set of RBs, is 30 kHz.

24. The apparatus of claim 23, wherein the relaxed measurement timeline includes:

a baseline time period between at least one of (i) a first end of downlink control information (DCI) that indicates performance of the CLI measurement and a provision of the CLI measurement for the network node, (ii) a second end of a resource that corresponds to the CLI SRS measurement and the provision of the CLI measurement for the network node, or (iii) the first end of the DCI that indicates performance of the CLI measurement and the resource that corresponds to the CLI SRS measurement; and a relaxation time period that is based on a number of RBs associated with the SRS or associated with the entirety of the RF bandwidth.

25. The apparatus of claim 24, wherein the relaxation time period is further based on a subcarrier spacing (SCS) associated with the UE.

26. The apparatus of claim 14, wherein the UE is an enhanced reduced capability UE configured for at least one Internet of Things (IoT) functionality.

27. A method of wireless communication at a user equipment (UE), comprising:

obtaining a cross link interference (CLI) measurement based on a set of resource blocks (RBs) associated with a downlink (DL) channel from a network node, wherein the set of RBs includes one of (1) less than a total number of RBs configured for a signal strength CLI measurement or (2) at least the total number of RBs configured for a power CLI measurement, wherein the set of RBs is within a CLI time period that exceeds a CLI time threshold; and activating, based on the CLI measurement, a time division duplex (TDD) slot format associated with a TDD configuration or a communication schedule from the network node.

28. The method of claim 27, wherein the CLI time period is a measurement and reporting CLI time period that is configured by the network node for one or more high-function UEs, wherein the CLI time threshold is a measurement and reporting CLI time threshold that is configured by the network node.

29. A method of wireless communication at a network node, comprising:

receiving, from a user equipment (UE), a cross link interference (CLI) measurement based on a set of resource blocks (RBs) associated with a downlink (DL) channel from the network node, wherein the set of RBs includes one of (1) less than a total number of RBs configured for a signal strength CLI measurement or (2) at least the total number of RBs configured for a power CLI measurement, wherein the set of RBs is within a CLI time period that exceeds a CLI time threshold; and configuring, based on the CLI measurement for the UE or another UE associated with CLI measurements, a time division duplex (TDD) slot format or a communication schedule.

30. The method of claim 29, wherein the CLI time period is a measurement and reporting CLI time period that is configured by the network node for one or more high-function UEs, wherein the CLI time threshold is a measurement and reporting CLI time threshold that is configured by the network node.

* * * * *